United States Patent
Garcia et al.

(10) Patent No.: US 10,950,034 B1
(45) Date of Patent: Mar. 16, 2021

(54) SYSTEMS, METHODS, AND MEDIA FOR GENERATING VISUALIZATION OF PHYSICAL ENVIRONMENT IN ARTIFICIAL REALITY

(71) Applicant: Facebook Technologies, LLC, Menlo Park, CA (US)

(72) Inventors: Alberto Garcia Garcia, Redmond, WA (US); Gioacchino Noris, Zurich (CH); Gian Diego Tipaldi, Zurich (CH)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/773,850

(22) Filed: Jan. 27, 2020

(51) Int. Cl.
*G06T 15/00* (2011.01)
*G06T 15/40* (2011.01)
*G06T 7/11* (2017.01)
*G06T 15/20* (2011.01)

(52) U.S. Cl.
CPC ............ *G06T 15/40* (2013.01); *G06T 7/11* (2017.01); *G06T 15/20* (2013.01); *G06T 2207/10028* (2013.01)

(58) Field of Classification Search
None
See application file for complete search history.

(56) References Cited

U.S. PATENT DOCUMENTS

| | | | |
|---|---|---|---|
| 2003/0034974 A1* | 2/2003 | Welch | G06T 13/20 345/426 |
| 2019/0197765 A1* | 6/2019 | Molyneaux | G06T 7/187 |

* cited by examiner

*Primary Examiner* — Martin Mushambo
(74) *Attorney, Agent, or Firm* — Baker Botts L.L.P.

(57) ABSTRACT

In one embodiment for generating passthrough, a computing system may compute, based on an image of a physical environment, depth measurements of at least one physical object. The system may generate a first model of the physical object using the depth measurements. The system may identify first pixels in the image that depict the physical object and associate them with a first representative depth value computed using the first model. The system may determine, for a pixel of an output image, that a portion of the first model and a portion of a second model of a virtual object are visible. The system may determine that the portion of the first model is associated with the plurality of first pixels and determine occlusion at the pixel based on a comparison between the first representative depth value and a depth value associated with the portion of the second model.

20 Claims, 15 Drawing Sheets

(5 of 15 Drawing Sheet(s) Filed in Color)

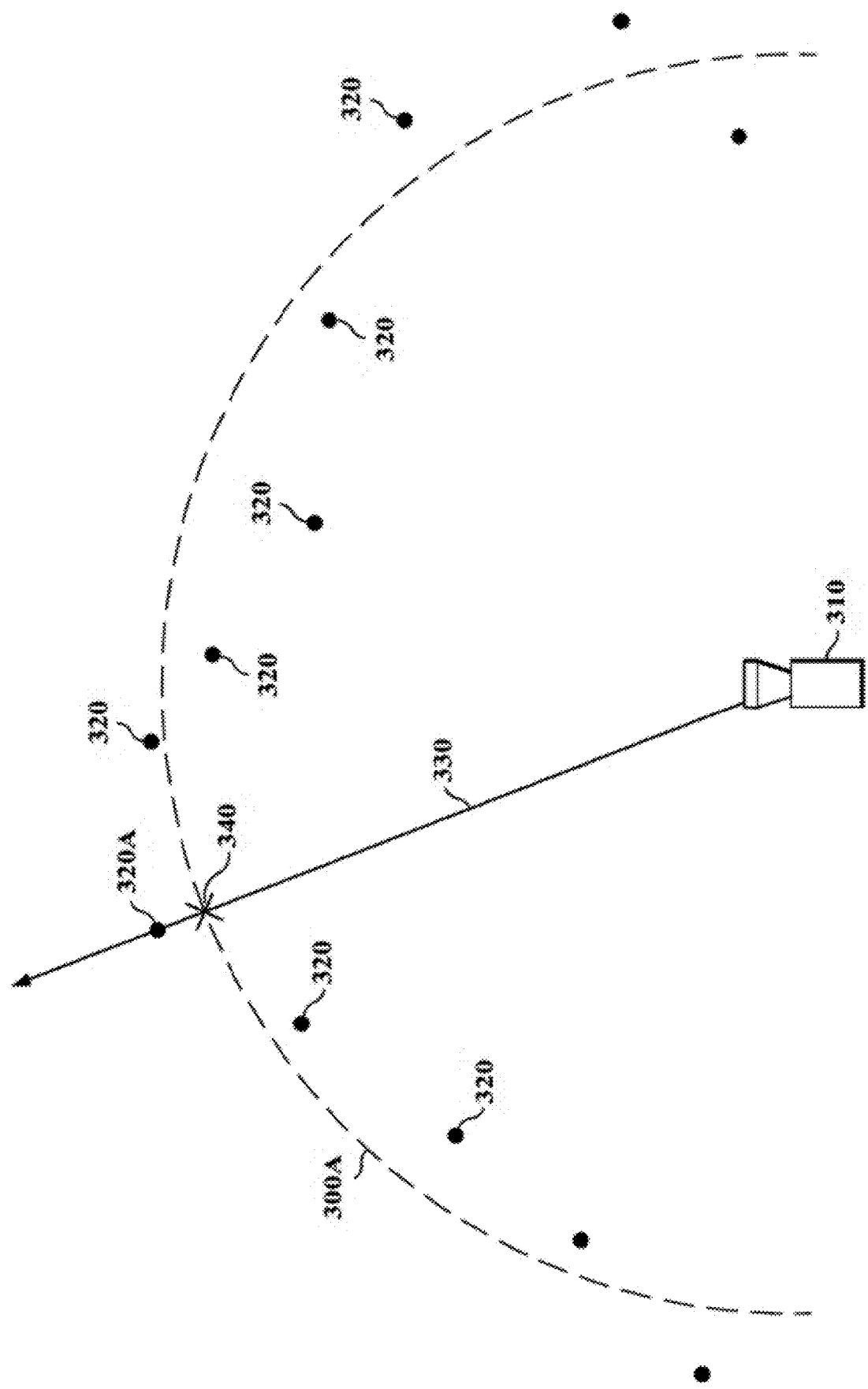

US 10,950,034 B1

SYSTEMS, METHODS, AND MEDIA FOR GENERATING VISUALIZATION OF PHYSICAL ENVIRONMENT IN ARTIFICIAL REALITY

TECHNICAL FIELD

This disclosure generally relates to computer graphics and 3D reconstruction techniques.

BACKGROUND

Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, any of which may be presented in a single channel or in multiple channels (such as stereo video that produces a three-dimensional effect to the viewer). Artificial reality may be associated with applications, products, accessories, services, or some combination thereof, that are, e.g., used to create content in artificial reality and/or used in (e.g., perform activities in) an artificial reality.

Artificial reality systems that provide artificial reality content may be implemented on various platforms, including a head-mounted device (HMD) connected to a host computer system, a standalone HMD, a mobile device or computing system, or any other hardware platform capable of providing artificial reality content to one or more viewers. When a user is wearing an HMD, his vision of the physical environment is occluded by the physical structure of the HMD. For example, the displays of the HMD could be positioned directly in front of and in close proximity to the user's eyes. Thus, whenever the user needs to see his physical surroundings, he would need to remove the HMD. Even if the removal of the HMD is temporary, doing so is inconvenient and disruptive to the user experience.

SUMMARY OF PARTICULAR EMBODIMENTS

"Passthrough" is a feature that allows a user wearing an HMD to see his physical surroundings by displaying visual information captured by the HMD's front-facing cameras. To account for misalignment between the stereo cameras and the user's eyes and to provide parallax, the passthrough images are re-rendered based on a 3D model representation of the physical surrounding. The 3D model, however, may not be precise, especially at the edges of the modeled objects. Consequently, when a virtual object is placed close to a passthrough object, the occlusion boundary between them may not be correct.

Embodiments described herein cover systems, methods, and media configured to improve how occlusion is rendered in passthrough visualizations. The embodiments address the aforementioned problem by generating an instance segmentation mask for particular objects in the captured image (e.g., persons, pets, etc.) and computing a depth measurement for the mask based on the corresponding portion of the 3D model. The outer edges of the mask (e.g., the gradient of the depicted object) may be assigned a significantly farther depth measurement so that the depth measurements between the mask and its outer edges have sufficient contrast. When rendering the passthrough scene, the rendering system may sample the mask for the assigned depth values and use them to determine occlusion. This results in s improvement in the appearance of in passthrough visualizations with respect to occlusions.

The embodiments disclosed herein are only examples, and the scope of this disclosure is not limited to them. Particular embodiments may include all, some, or none of the components, elements, features, functions, operations, or steps of the embodiments disclosed herein. Embodiments according to the invention are in particular disclosed in the attached claims directed to a method, a storage medium, a system, and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIGS. 3A and 3B provide top-down illustrations of a 3D mesh being deformed to represent the contours of an observed environment, in accordance with particular embodiments.

DESCRIPTION OF EXAMPLE EMBODIMENTS

"Passthrough" is a feature that allows a user to see his physical surroundings while wearing an HMD. Information about the user's physical environment is visually "passed through" to the user by having the HMD display information captured by the headset's external-facing cameras. Simply displaying the captured images would not work as intended, however. Since the locations of the cameras do not coincide with the locations of the user's eyes, the images captured by the cameras do not accurately reflect the user's perspective. In addition, since the images have no depth, simply displaying the images would not provide the user with proper parallax effects if he were to shift away from where the images were taken. Thus, rather than simply displaying the captured images, the passthrough feature extracts information about the environment from the captured images (e.g., depth information), use the information to generate a 3D model of the environment, and reconstruct a scene of the modeled environment from the user's current viewpoint.

Figure 1A:
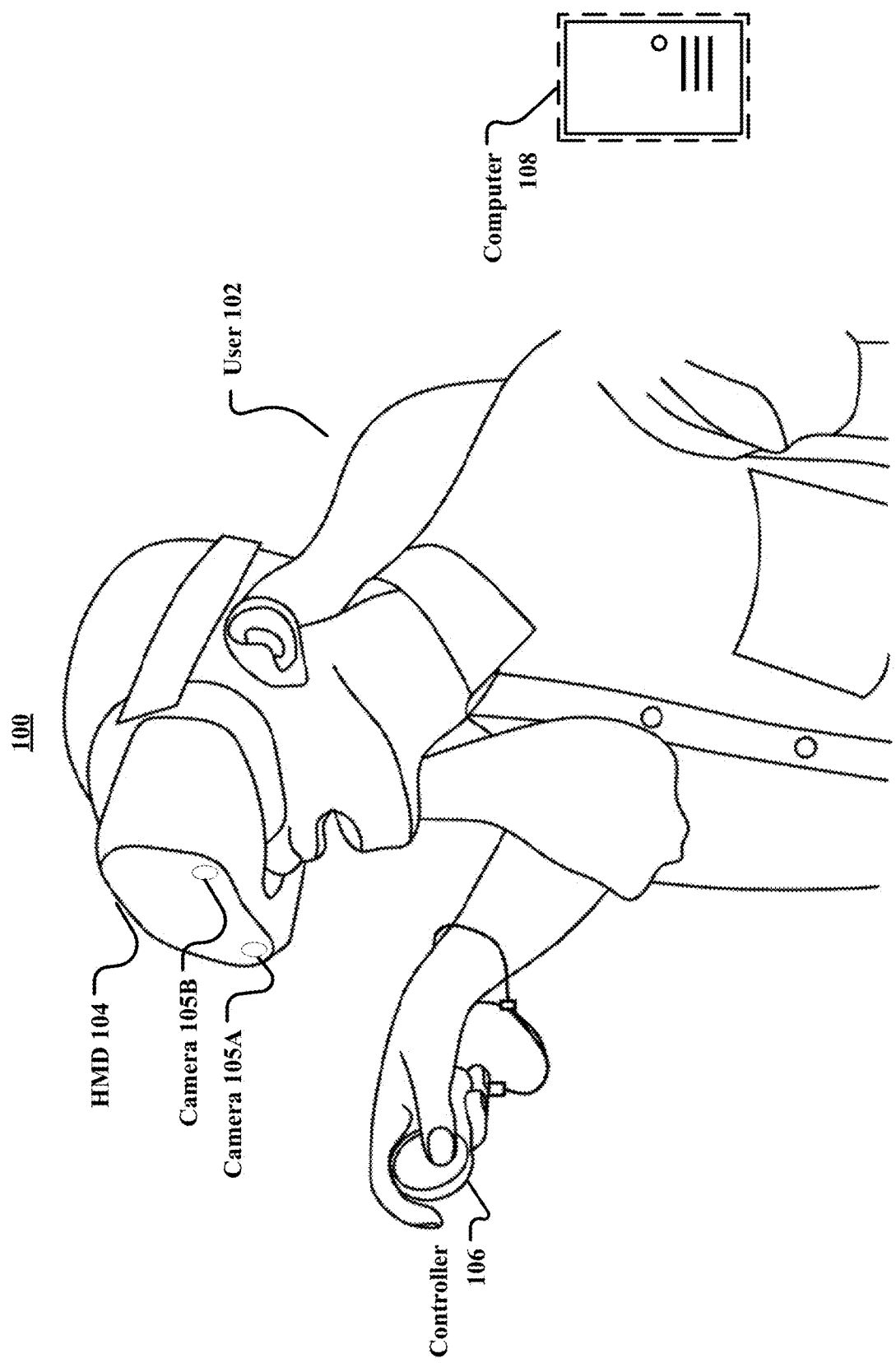
FIG. 1A illustrates an example artificial reality system worn by a user, in accordance with particular embodiments.

FIG. 1A illustrates an example of an artificial reality system 100 worn by a user 102. In particular embodiments, the artificial reality system 100 may comprise a head-mounted device ("HMD") 104, a controller 106, and a computing system 108. The HMD 104 may be worn over the user's eyes and provide visual content to the user 102 through internal displays (not shown). The HMD 104 may have two separate internal displays, one for each eye of the user 102. As illustrated in FIG. 1A, the HMD 104 may completely cover the user's field of view. By being the exclusive provider of visual information to the user 102, the HMD 104 achieves the goal of providing an immersive artificial-reality experience. One consequence of this, however, is that the user 102 would not be able to see the physical environment surrounding him, as his vision is shielded by the HMD 104. As such, the passthrough feature described herein is needed to provide the user with real-time visual information about his physical surroundings.

Figure 1B:
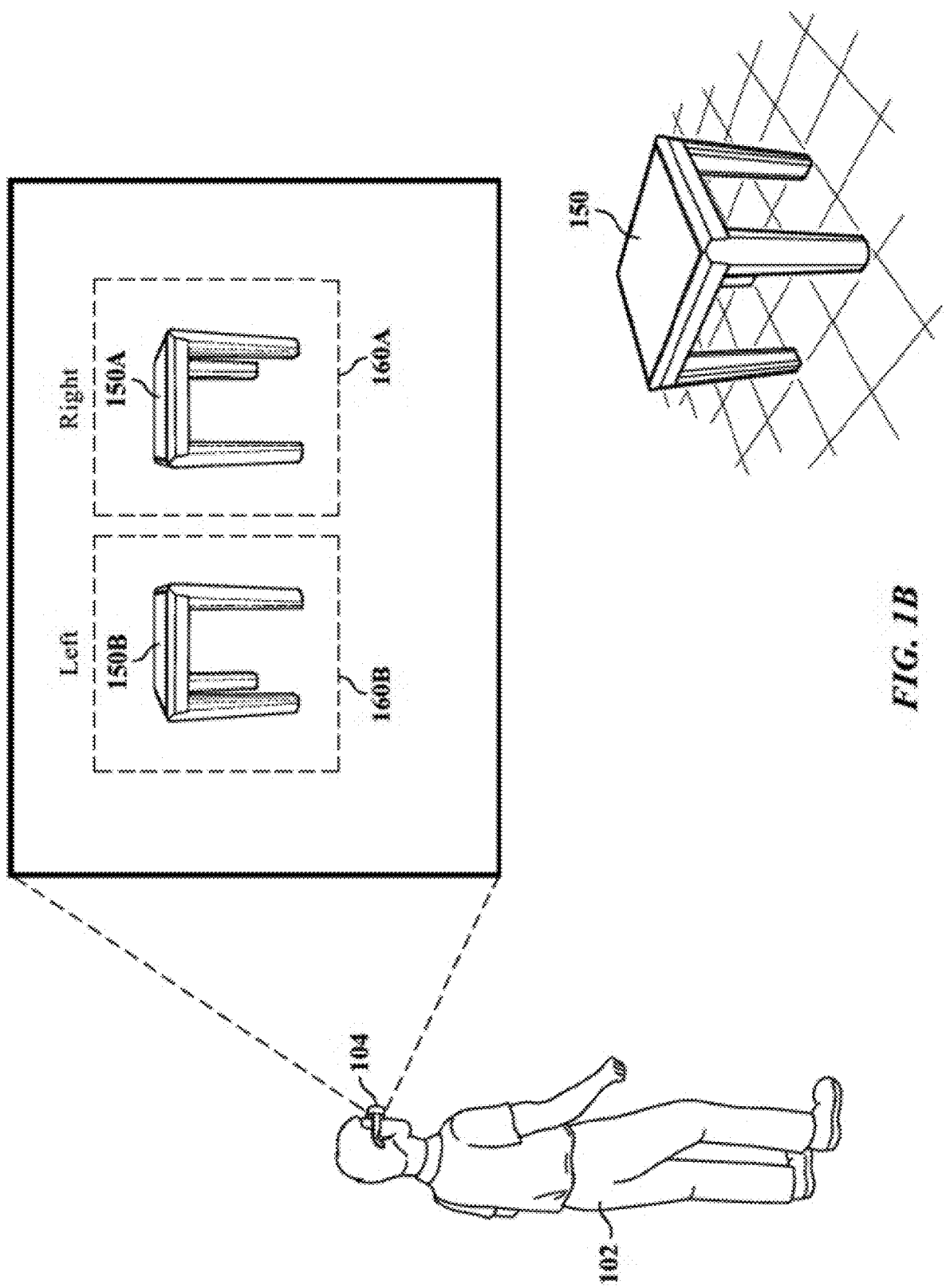
FIG. 1B illustrates an example of a passthrough feature, in accordance with particular embodiments.

FIG. 1B illustrates an example of the passthrough feature. A user 102 may be wearing an HMD 104, immersed within a virtual reality environment. A physical table 150 is in the physical environment surrounding the user 102. However, due to the HMD 104 blocking the vision of the user 102, the user 102 is unable to directly see the table 150. To help the user perceive his physical surroundings while wearing the HMD 104, the passthrough feature captures information about the physical environment using, for example, the aforementioned external-facing cameras 105A-B. The captured information may then be re-projected to the user 102 based on his viewpoints. In particular embodiments where the HMD 104 has a right display 160A for the user's right eye and a left display 160B for the user's left eye, the system 100 may individually render (1) a re-projected view 150A of the physical environment for the right display 160A based on a viewpoint of the user's right eye and (2) a re-projected view 150B of the physical environment for the left display 160B based on a viewpoint of the user's left eye.

Referring again to FIG. 1A, the HMD 104 may have external-facing cameras, such as the two forward-facing cameras 105A and 105B shown in FIG. 1A. While only two forward-facing cameras 105A-B are shown, the HMD 104 may have any number of cameras facing any direction (e.g., an upward-facing camera to capture the ceiling or room lighting, a downward-facing camera to capture a portion of the user's face and/or body, a backward-facing camera to capture a portion of what's behind the user, and/or an internal camera for capturing the user's eye gaze for eye-tracking purposes). The external-facing cameras are configured to capture the physical environment around the user and may do so continuously to generate a sequence of frames (e.g., as a video). As previously explained, although images captured by the forward-facing cameras 105A-B may be directly displayed to the user 102 via the HMD 104, doing so would not provide the user with an accurate view of the physical environment since the cameras 105A-B cannot physically be located at the exact same location as the user's eyes. As such, the passthrough feature described herein uses a re-projection technique that generates a 3D representation of the physical environment and then renders images based on the 3D representation from the viewpoints of the user's eyes.

The 3D representation may be generated based on depth measurements of physical objects observed by the cameras 105A-B. Depth may be measured in a variety of ways. In particular embodiments, depth may be computed based on stereo images. For example, the two forward-facing cameras 105A-B may share an overlapping field of view and be configured to capture images simultaneously. As a result, the same physical object may be captured by both cameras 105A-B at the same time. For example, a particular feature of an object may appear at one pixel $p_A$ in the image captured by camera 105A, and the same feature may appear at another pixel $p_B$ in the image captured by camera 105B. As long as the depth measurement system knows that the two pixels correspond to the same feature, it could use triangulation techniques to compute the depth of the observed feature. For example, based on the camera 105A's position within a 3D space and the pixel location of $p_A$ relative to the camera 105A's field of view, a line could be projected from the camera 105A and through the pixel $p_A$. A similar line could be projected from the other camera 105B and through the pixel $p_B$. Since both pixels are supposed to correspond to the same physical feature, the two lines should intersect. The two intersecting lines and an imaginary line drawn between the two cameras 105A and 105B form a triangle, which could be used to compute the distance of the observed feature from either camera 105A or 105B or a point in space where the observed feature is located.

In particular embodiments, the pose (e.g., position and orientation) of the HMD 104 within the environment may be needed. For example, in order to render the appropriate display for the user 102 while he is moving about in a virtual environment, the system 100 would need to determine his position and orientation at any moment. Based on the pose of the HMD, the system 100 may further determine the viewpoint of either of the cameras 105A and 105B or either of the user's eyes. In particular embodiments, the HMD 104 may be equipped with inertial-measurement units ("IMU"). The data generated by the IMU, along with the stereo imagery captured by the external-facing cameras 105A-B, allow the system 100 to compute the pose of the HMD 104 using, for example, SLAM (simultaneous localization and mapping) or other suitable techniques.

In particular embodiments, the artificial reality system 100 may further have one or more controllers 106 that enable the user 102 to provide inputs. The controller 106 may communicate with the HMD 104 or a separate computing unit 108 via a wireless or wired connection. The controller 106 may have any number of buttons or other mechanical input mechanisms. In addition, the controller 106 may have an IMU so that the position of the controller 106 may be tracked. The controller 106 may further be tracked based on predetermined patterns on the controller. For example, the controller 106 may have several infrared LEDs or other known observable features that collectively form a predetermined pattern. Using a sensor or camera, the system 100 may be able to capture an image of the predetermined pattern on the controller. Based on the observed orientation of those patterns, the system may compute the controller's position and orientation relative to the sensor or camera.

The artificial reality system 100 may further include a computer unit 108. The computer unit may be a stand-alone unit that is physically separate from the HMD 104, or it may be integrated with the HMD 104. In embodiments where the computer 108 is a separate unit, it may be communicatively coupled to the HMD 104 via a wireless or wired link. The computer 108 may be a high-performance device, such as a desktop or laptop, or a resource-limited device, such as a mobile phone. A high-performance device may have a dedicated GPU and a high-capacity or constant power source. A resource-limited device, on the other hand, may not have a GPU and may have limited battery capacity. As such, the algorithms that could be practically used by an artificial reality system 100 depends on the capabilities of its computer unit 108.

In embodiments where the computing unit 108 is a high-performance device, an embodiment of the passthrough feature may be designed as follows. Through the external-facing cameras 105A-B of the HMD 104, a sequence of images of the surrounding physical environment may be captured. The information captured by the cameras 105A-B, however, would be misaligned with what the user's eyes would capture since the cameras could not spatially coincide with the user's eyes (e.g., the cameras would be located some distance away from the user's eyes and, consequently, have different viewpoints). As such, simply displaying what the cameras captured to the user would not be an accurate representation of what the user should perceive.

Instead of simply displaying what was captured, the passthrough feature would re-project information captured by the external-facing cameras 105A-B to the user. Each pair of simultaneously captured stereo images may be used to estimate the depths of observed features. As explained above, to measure depth using triangulation, the computing unit 108 would need to find correspondences between the stereo images. For example, the computing unit 108 would determine which two pixels in the pair of stereo images correspond to the same observed feature. A high-performance computing unit 108 may solve the correspondence problem using its GPU and optical flow techniques, which are optimized for such tasks. The correspondence information may then be used to compute depths using triangulation techniques. Based on the computed depths of the observed features, the computing unit 108 could determine where those features are located within a 3D space (since the computing unit 108 also knows where the cameras are in that 3D space). The result may be represented by a dense 3D point cloud, with each point corresponding to an observed feature. The dense point cloud may then be used to generate 3D models of objects in the environment. When the system renders a scene for display, the system could perform visibility tests from the perspectives of the user's eyes. For example, the system may cast rays into the 3D space from a viewpoint that corresponds to each eye of the user. In this manner, the rendered scene that is displayed to the user would be computed from the perspective of the user's eyes, rather than from the perspective of the external-facing cameras 105A-B.

The process described above, however, may not be feasible for a resource-limited computing unit (e.g., a mobile phone may be the main computational unit for the HMD). For example, unlike systems with powerful computational resources and ample energy sources, a mobile phone cannot rely on GPUs and computationally-expensive algorithms (e.g., optical flow) to perform depth measurements and generate an accurate 3D model of the environment. Thus, to provide passthrough on resource-limited devices, an optimized process is needed.

Figure 2:
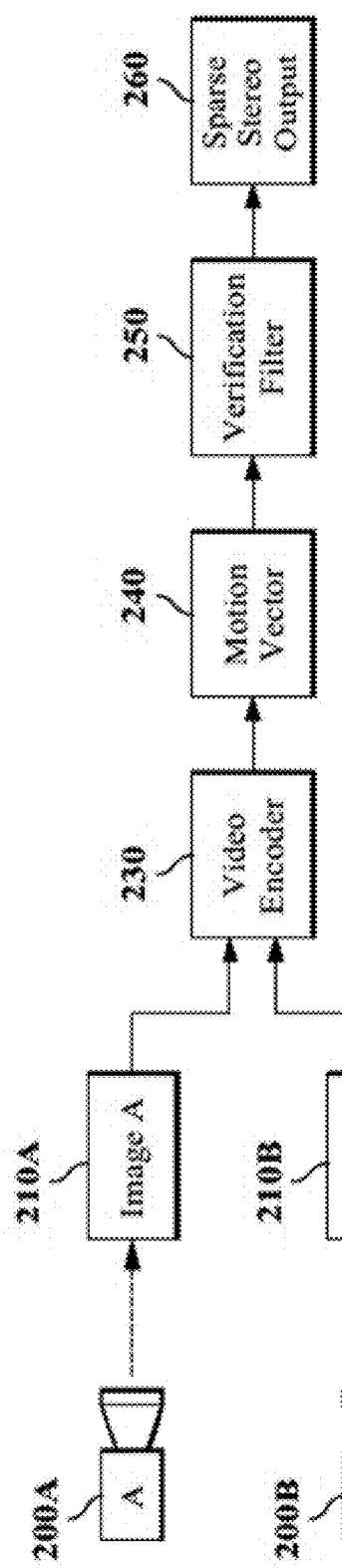
FIG. 2 illustrates an optimized depth estimation technique that leverages a device's video encoder, in accordance with particular embodiments.

FIG. 2 illustrates an optimized depth estimation technique that leverages a device's video encoder 230, in accordance with particular embodiments. A video encoder 230 (hardware or software) is designed to be used for video compression. It is common on any computing device capable of capturing and displaying video, even resource-limited ones like mobile phones. The video encoder 230 achieves compression by leveraging the temporal consistency that is often present between sequential frames. For example, in a video sequence captured by a camera that is moving relative to an environment, the frame-by-frame difference would likely be fairly minimal. Most objects appearing in one frame would continue to appear in the next, with only slight offsets relative to the frame due to changes in the camera's perspective. Thus, instead of storing the full color values of all the pixels in every frame, the video encoder predicts where the pixels in one frame (e.g., a frame at time t, represented by $f_t$) came from in a previous frame (e.g., a frame at time t−1, represented by $f_{t-1}$), or vice versa. The encoded frame may be referred to as a motion vector. Each grid or cell in the motion vector corresponds to a pixel in the frame $f_t$ that the motion vector is representing. The value in each grid or cell stores a relative offset in pixel space that identifies the likely corresponding pixel location in the previous frame $f_{t-1}$. For example, if the pixel at coordinate (10, 10) in frame $f_t$ corresponds to the pixel at coordinate (7, 8) in the previous frame $f_{t-1}$, the motion vector for frame $f_t$ would have grid or cell at coordinate (10, 10) that specifies a relative offset of (−3, −2) that could be used to identify the pixel coordinate (7, 8).

In particular embodiments, the correspondences between two stereo images may be computed using a device's video encoder. FIG. 2 shows two stereo cameras 200A and 200B that simultaneously capture a pair of stereo images 210A and 210B, respectively. Using an API provided for the device's video encoder, the passthrough feature may instruct the video encoder 230 to process the two stereo images 210A and 210B. However, since video encoders 230 are designed to find correspondence between sequential frames captured at a high frame rate (e.g., 30, 60, 80, or 100 frames-per-second), which means that sequential frames are likely very similar, having the video encoder 230 find correspondences between two simultaneously captured stereo images 210A-210B may yield suboptimal results. Thus, in particular embodiments, one or both of the images 210A-210B may undergo a translation based on the known physical separation between the two cameras 200A and 200B so that the images 210A and 210B would be more similar.

The output of the video encoder 230 may be a motion vector 240 that describes the predicted correspondences between images 210A and 210B using per-pixel offsets. The motion vector 240, however, could be noisy (i.e., many of the correspondences could be inaccurate). Thus, in particular embodiments, the motion vector 240 may undergo one or more verification filters 250 to identify the more reliable correspondence predictions. For example, one verification filter 250 may use the known geometry of the cameras 200A and 200B to determine epipolar lines for each pixel. Using the epipolar line associated with each pixel, the computing device could determine whether the corresponding pixel as identified by the motion vector 240 is a plausible candidate. For example, if the corresponding pixel falls on or within a threshold distance of the epipolar line, then the corresponding pixel may be deemed plausible. Otherwise, the corresponding pixel may be deemed implausible and the correspondence result would be rejected from being used in subsequent depth computations.

In particular embodiments, the verification filter 250 may assess the reliability of a correspondence found by the motion vector 240 based on temporal observations. This temporal filtering process may be applied to the original motion vector 240 or only to a subset of the motion vector 240 that survived the epipolar filtering process. For each correspondence undergoing the temporal filtering process, the system may compute the depth value using triangulation. The depth values may be represented as a point cloud in 3D space. The temporal filtering process may check whether the same points can be consistently observed through time. For example, the computing system may have a camera capture an image from a particular current perspective and compare it to a projection of the point cloud into a screen space associated with the current perspective. As an example, given the current perspective, the device may compute where, in screen space (e.g., the location of a particular pixel), the user should see each point in the point cloud. This may be done by projecting each point towards a point representation of the current perspective. As each point is being projected, it passed through a screen space of the current perspective. The location where the projected point intersects the screen space corresponds to a pixel location where that point is expected to appear. By comparing the projected pixel location to the same pixel location in the captured image, the system could determine whether the two pixels likely correspond to each other. If so, that point in the point cloud gets a positive vote; otherwise, it gets a negative vote. The points with a sufficiently high vote would be used as the final set of reliable points.

After the verification filtering process 250, the system would have a collection of stereo outputs or depth measurements 260. The collection 260 may be very sparse (or low resolution). For example, if each image has a resolution of 640×480 pixels, that means a high-accuracy correspondence could yield upwards of 307,200 depth measurements or points. Due to the noise and inaccuracy of the motion vector 240, the number of reliable points after the verification filtering process 250 may be in the range of, e.g., 1000-3000 points.

In particular embodiments, the computing device may be configured to dynamically determine, at runtime, whether it is capable of or able to generate depth measurements using (1) the GPU and optical flow or (2) the video encoder and motion vectors. For example, if the device has a GPU and sufficient power budget (e.g., it is plugged into a power source, has a full battery, etc.), it may perform depth measurements using its GPU and optical flow. However, if the device does not have a GPU or has a stringent power budget, then it may opt for the optimized method for computing depths, as described above with reference to FIG. 2.

Once the computing device has generated a point cloud (whether dense or sparse) based on the depth measurements, it may generate a 3D mesh representation of a contour of the observed environment. For high-performance devices, accurate models of objects in the environment may be generated (e.g., each object, such as a table or a chair, may have its own 3D model). However, for resource-limited devices, the cost of generating such models and/or the underlying depth measurements for generating the models may be prohibitive. Thus, in particular embodiments, the 3D mesh representation for the environment may be a coarse approximation of the general contour of the objects in the environment. In particular embodiments, a single 3D mesh may be used to approximate all the objects observed. Conceptually, the 3D mesh is analogous to a blanket or sheet that covers the entire observable surfaces in the environment.

Figure 3B:
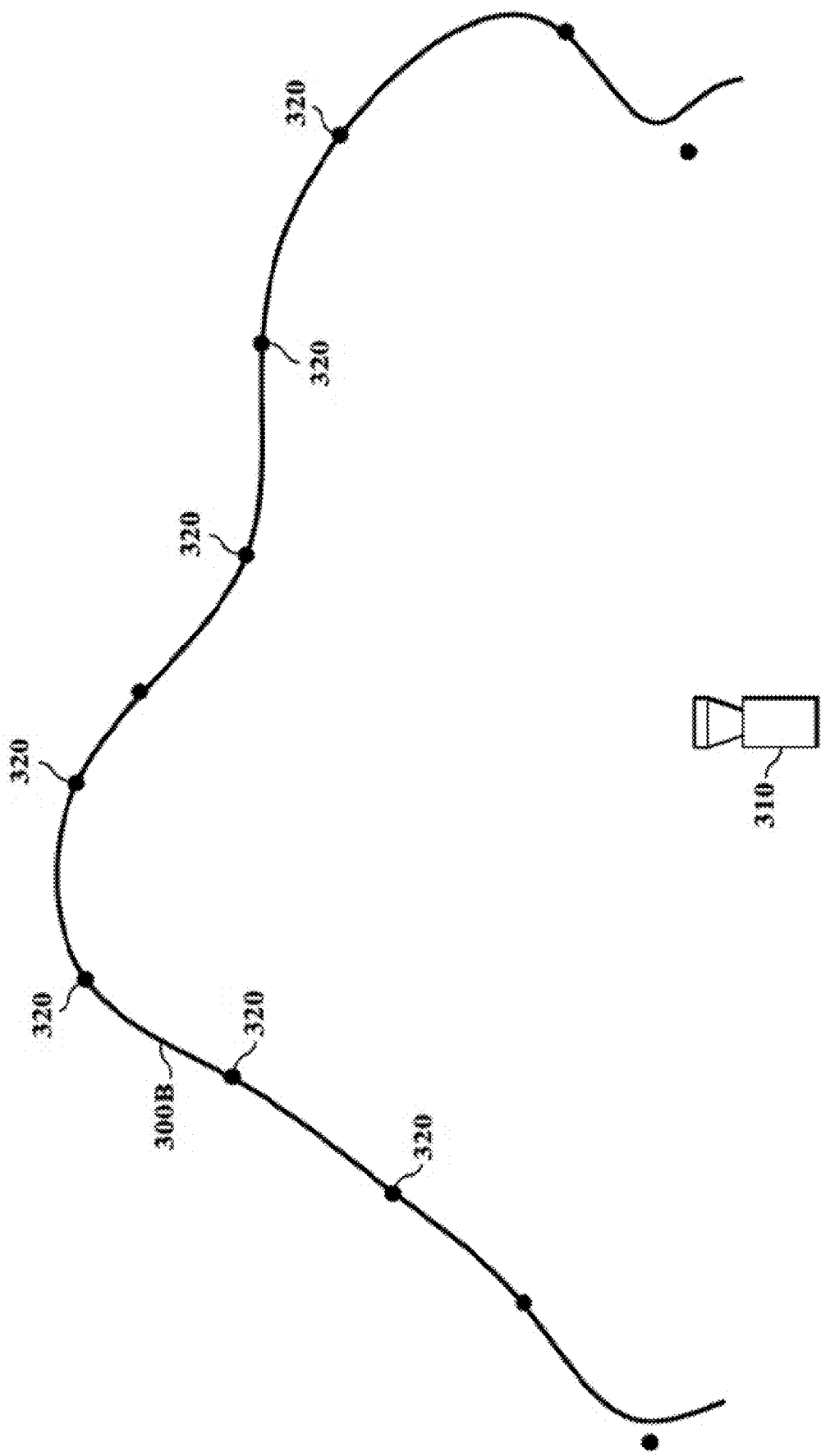

FIGS. 3A and 3B provide top-down illustrations of a 3D mesh being deformed to represent the contours of an observed environment. For clarity, the figures are drawn in 2D, but it should be understood that the 3D mesh is a 3D construct. FIG. 3A illustrates an embodiment of the 3D mesh 300A being initialized to be equal-distance (e.g., 1, 2, 2.5, or 3 meters) from a viewer 310 (represented by a camera). In the particular example shown, the radius of the 3D mesh 300A is 2 meters. Since the 3D mesh 300A is equal-distance away from the viewer 310, it forms a hemisphere around the user. For clarity, FIG. 3A illustrates a portion of a cross-section of that hemisphere, resulting in the half-circle shown. FIG. 3A further illustrates points (e.g., 320) in the point cloud that are deemed reliable. These points 320 represent observed features in the environment and may be generated using the embodiments described elsewhere herein.

The 3D mesh 300A may be deformed according to the points 320 in order to model the contour of the environment. In particular embodiments, the 3D mesh 300A may be deformed based on the viewer's 310 position and the points 320 in the point cloud. To determine which portion of the 3D mesh 300A corresponds to each point in the point cloud 320, the computing device may cast a conceptual ray from the viewer's 310 position towards that point. Each ray would intersect with a primitive (e.g., a triangle or other polygon) of the 3D mesh. For example, FIG. 3A shows a ray 330 being cast from the viewer 310 towards point 320A. The ray 330 intersects the 3D mesh 300A at a particular location 340. As a result, mesh location 340 is deformed based on the depth value associated with the point 320A. For example, if the point 320 is 2.2 meters away from the viewer 310, the depth value associated with the mesh location 340 may be updated to become 2.2 meters from its initial value of 2 meters. FIG. 3B illustrates the deformed 3D mesh 300B that may result from the deformation process. At this point, the deformed mesh 300B represents the contour of the physical environment observed by the viewer 310.

Figure 4:
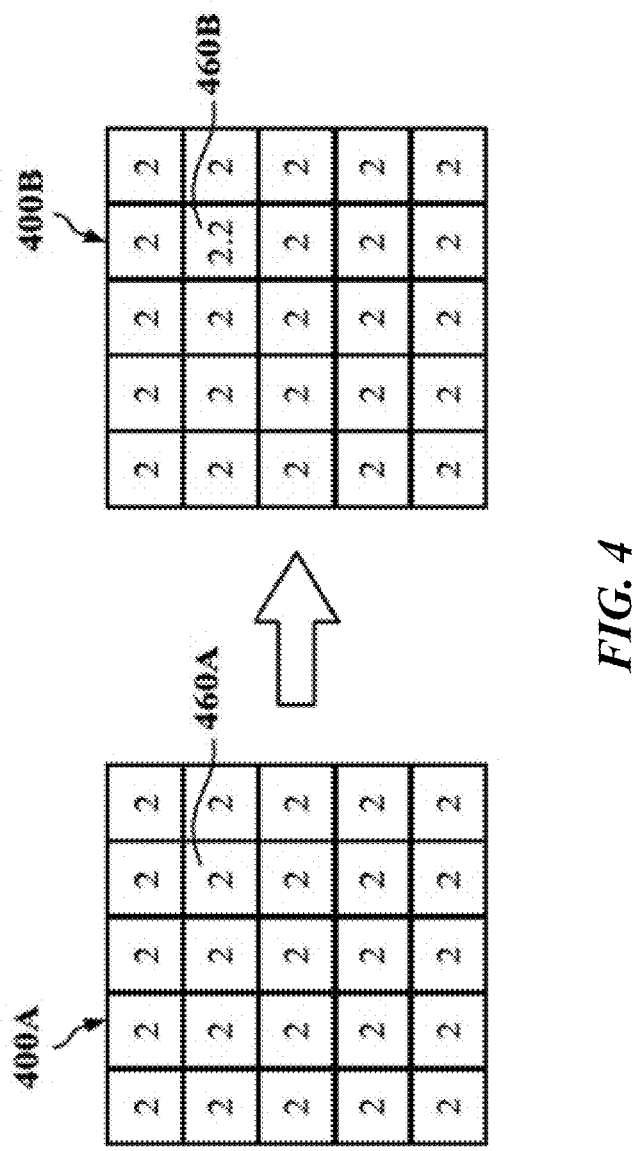
FIG. 4 illustrates an example of a data structure that may be used to represent the 3D mesh, in accordance with particular embodiments.

FIG. 4 illustrates an example of a data structure that may be used to represent the 3D mesh. In particular embodiments, the depth values that define the shape of the 3D mesh (e.g., mesh 300A shown in FIG. 3A) may be stored within a matrix 400A. The vertices of the primitives that form the mesh 300A may each have a corresponding cell in the matrix 400A, where the depth value of that vertex is stored. In particular embodiments, the coordinates of each cell within the matrix 400A may correspond to the radial coordinates of the vertex in the mesh, as measured relative to the viewer 310. Initially, the depth stored in each cell of the matrix 400A may be initialized to the same distance (e.g., 2 meters), which would result in the hemispheric mesh 300A shown in FIG. 3A. Based on the ray casting process described above, the depth values stored in the matrix 400A may be updated. For example, referring again to FIG. 3A, the ray 330 that was cast towards point 320A may intersect the mesh at location 340. The computing device may determine that the location 340 on the mesh 300A corresponds to cell 460A in the matrix 400A. The current depth stored in cell 460A may be updated to reflect the depth value of point 320A, which is 2.2 meters in the particular example given. As a result, the updated matrix 400B stores 2.2 as the depth value in the updated cell 460B. In particular embodiments, after the entire matrix has been updated based on the available points in the point cloud, the updated matrix may be processed using a Poisson model or any other suitable technique to, in effect, smooth the contours of the splines of the 3D mesh. The result is a 3D mesh contour that represents the depth of the observed world.

Figure 5:
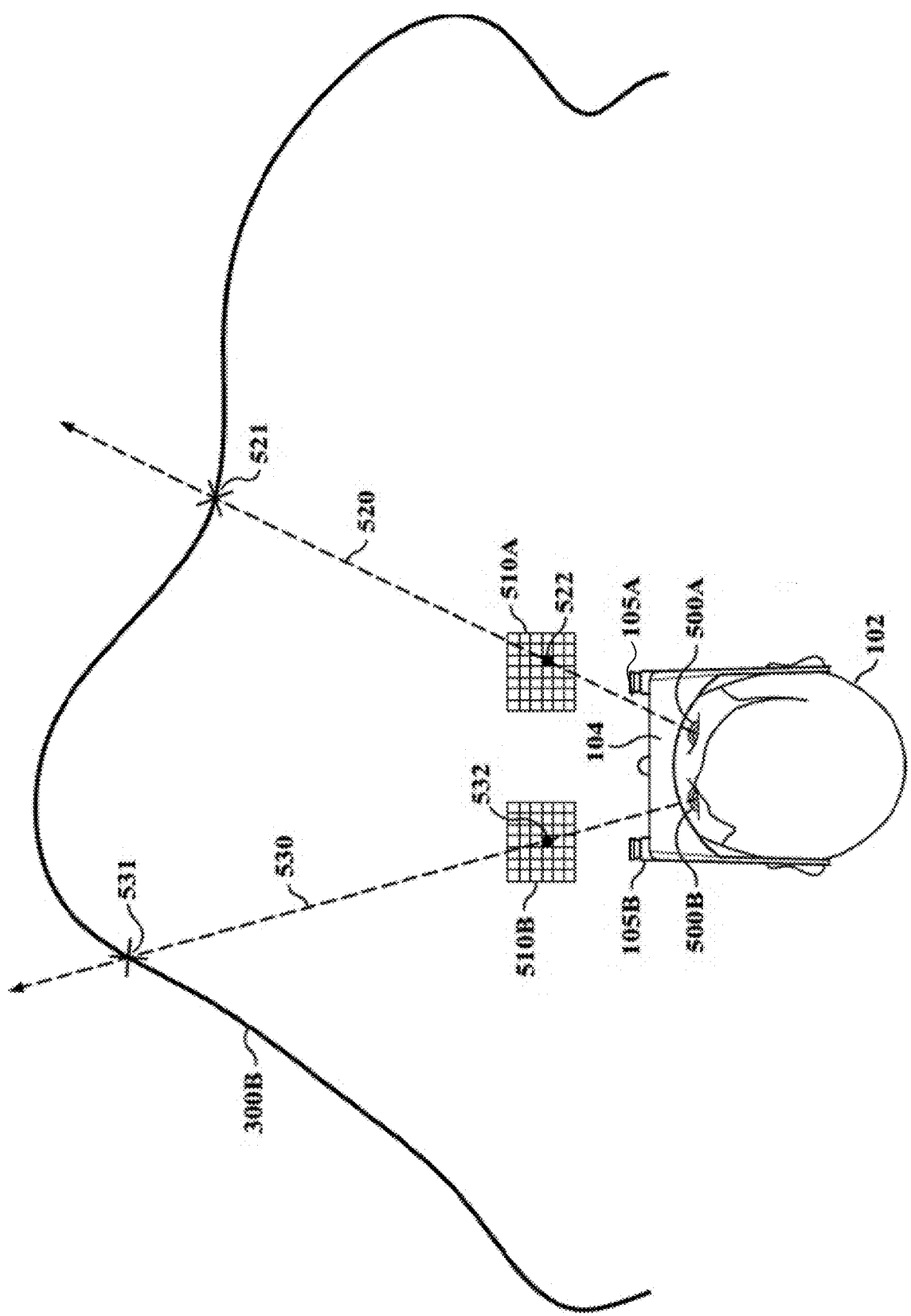
FIG. 5 provides an illustration of 3D-passthrough rendering based on the 3D mesh, in accordance with particular embodiments.

FIG. 5 provides an illustration of 3D-passthrough rendering based on the 3D mesh. In particular embodiments, the rendering system may determine the user's 102 current viewing position relative to the environment. In particular embodiments, the system may compute the pose of the HMD 104 using SLAM or other suitable techniques. Based on the known mechanical structure of the HMD 104, the system could then estimate the viewpoints of the user's eyes 500A and 500B using offsets from the pose of the HMD 104. The system may then render a passthrough image for each of the user's eyes 500A-B. For example, to render a passthrough image for the user's right eye 500A, the system may cast a ray 520 from the estimated viewpoint of the right eye 500A through each pixel of a virtual screen space 510A to see which portion of the mesh 300B the rays would intersect. This ray casting process may be referred to as a visibility test, as the objective is to determine what is visible from the selected viewpoint 500A. In the particular example shown, the ray 520 projected through a particular pixel 522 intersects with a particular point 521 on the mesh. This indicates that the point of intersection 521 is to be displayed by the pixel 522. Once the point of intersection 521 is found, the rendering system may sample a corresponding point in a texture image that is mapped to the point of intersection 521. In particular embodiments, the image captured by the cameras 105A-B of the HMD 104 may be used to generate a texture for the mesh 300B. Doing so allows the rendered image to appear more like the actual physical object. In a similar manner, the rendering system may render a passthrough image for the user's left eye 500B. In the example shown, a ray 530 may be cast from the left-eye viewpoint 500B through pixel 532 of the left screen space 510B. The ray 530 intersects the mesh 300B at location 531. The rendering system may then sample a texture image at a texture location corresponding to the location 531 on the mesh 300B and compute the appropriate color to be displayed by pixel 532. Since the passthrough images are re-rendered from the user's viewpoints 500A-B, the images would appear natural and provide proper parallax effect.

Figure 6:
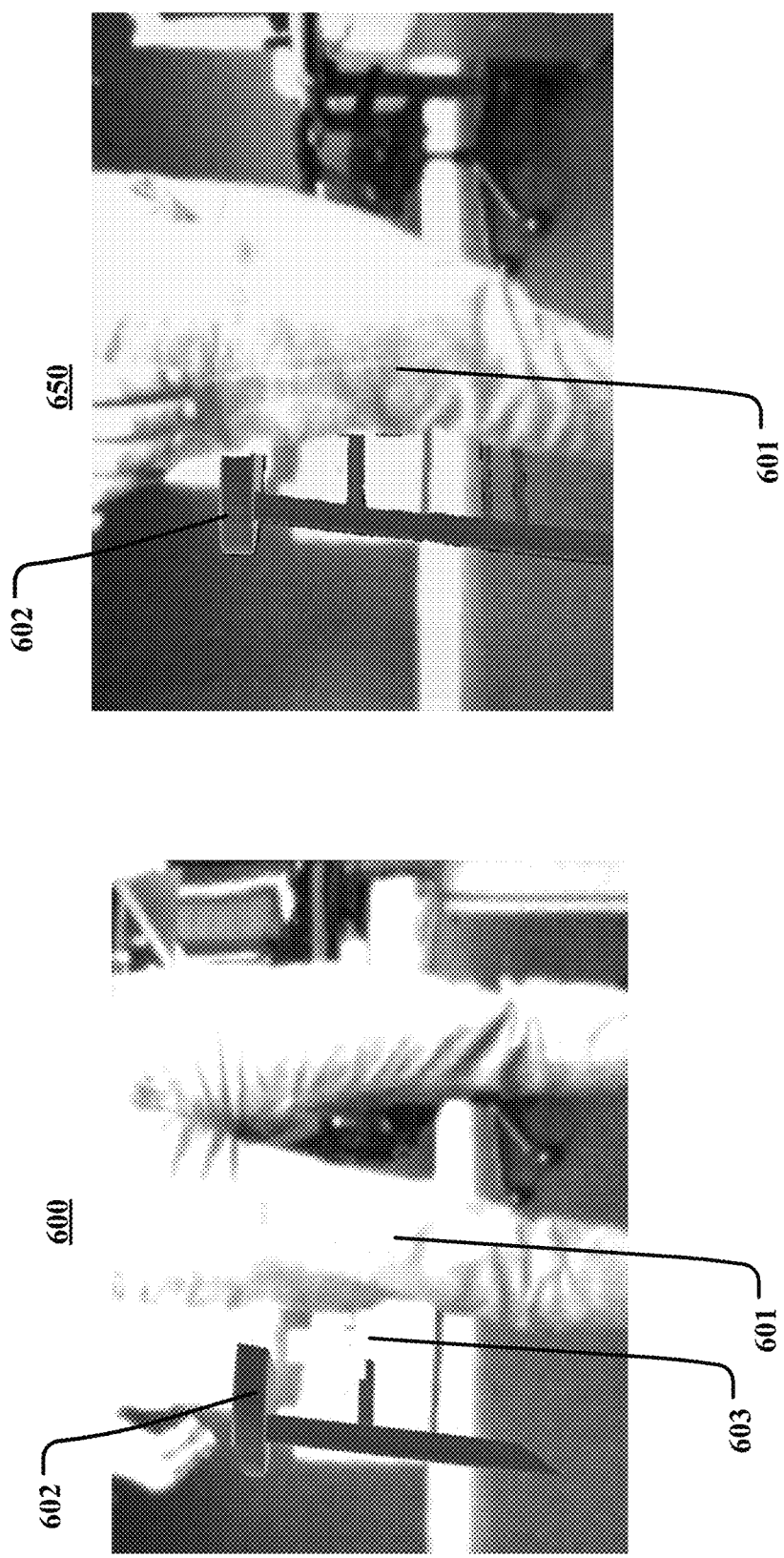
FIG. 6 illustrates an example of occlusion artifacts in a mixed-reality scene that includes passthrough and virtual objects, in accordance with particular embodiments.

In particular embodiments, the passthrough visualization generated using the 3D model representation of the physical environment may be susceptible to incorrect occlusion rendering. FIG. 6 illustrates an example of occlusion artifacts in a mixed-reality scene that includes passthrough and virtual objects, in accordance with particular embodiments. The occlusion effect in the scene 600 on the left is rendered according to traditional rendering logic—objects that are closer to the viewer occlude objects that are farther, according to their 3D models. The mixed-reality scene 600 includes passthrough information reflecting the physical environment surrounding the user, which includes a passthrough visual of another person 601. As previously explained, in particular embodiments, the passthrough visual of the person 601 may be rendered based on a corresponding 3D model generated using estimated depth measurements. Since the estimated depth measurements could be inaccurate, the 3D model could also be inaccurate. Moreover, the manner in which the environment is modeled could also introduce imprecision. For example, if the contour of the environment is modeled using a single mesh, certain portions of the mesh may not be defined based on actual depth measurements. Rather, the depths of those portions of the mesh may be computed from interpolation or smoothing techniques. For example, since the floor has few trackable features from which to generate depth measurements, the depth measurements of the floor could be sparse. Thus, the mesh representation of the contour of the environment could extend from the depth measurements of the person 601 to the depth measurements of the sparse points on the floor, analogous to a blanket being thrown over the user's hand 510 and falling on the floor in the background.

Scene 600 also includes several virtual objects, such as the virtual stool 602. In this example, the person 601 is closer to the viewer than the virtual stool 602, and a portion of the person's 601 leg and a portion of the virtual stool 602 overlap in screen space (i.e., the x-y plane of scene 600). The rendering system determined that the person 601 is closer to the viewer and should occlude a portion of the virtual stool 602. However, a portion 603 of empty space around the person's leg is also shown to occlude the virtual stool 602, which is incorrect. This particular error is due to the inaccuracies in the 3D model representing the physical environment. In this particular example, the 3D model is a mesh that extends from the person 601 to the floor or wall behind the person 601. As such, the mesh corresponding to the portion of empty space 603 has interpolated depth values that are fairly close to that of the person 601, even though the true depth of that portion of empty space 603 should be much farther. Based on the inaccurate mesh, the rendering system determined that the portion of empty space 603 is in front of the stool 602, resulting in the unnatural and excessive occlusion effect.

Scene 650 illustrates an improved technique for rendering passthrough visualization, in accordance with particular embodiments. Scene 650 shows the person 601 occluding a portion of the virtual stool 602. However, unlike scene 600, scene 650 does not show the stool 602 being occluded by empty space surrounding the leg of the person 601. The result is a more natural and correct occlusion effect.

Figures 7A, 7B, 7C:
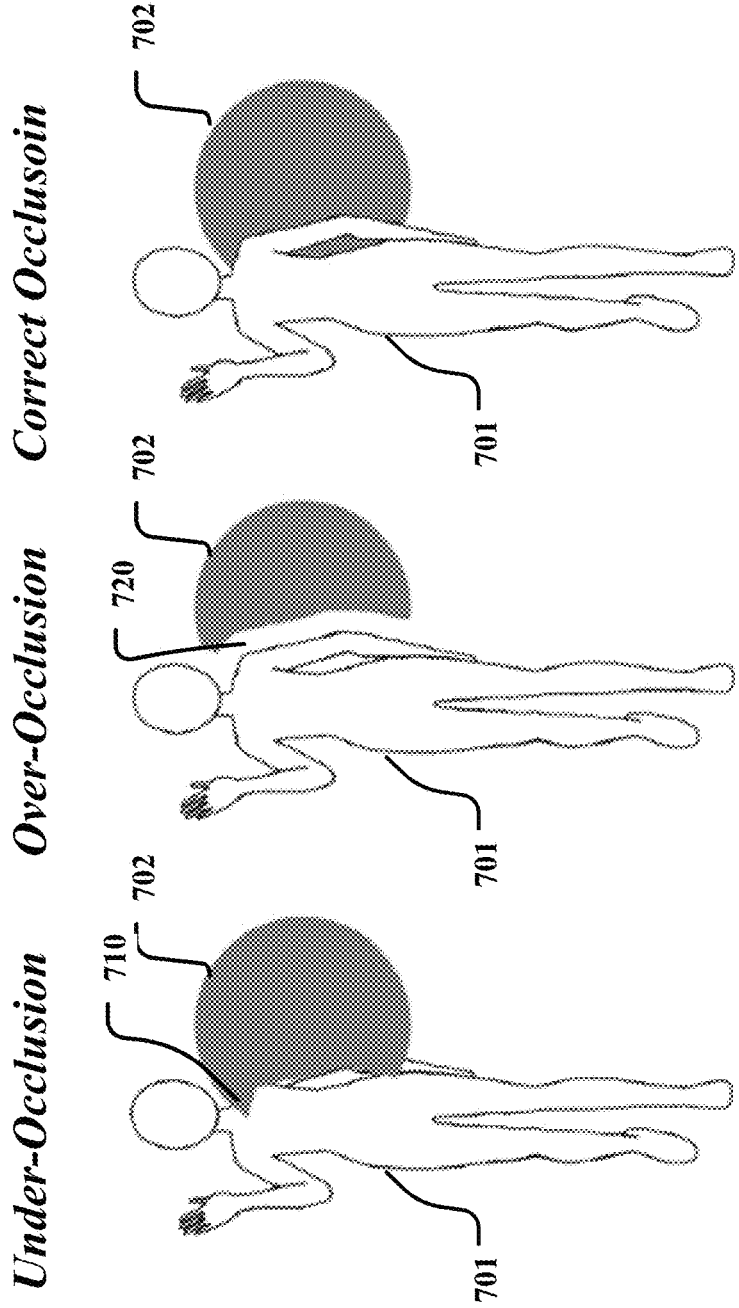
FIGS. 7A-7C illustrate different types of incorrect and correct occlusion effects.

FIGS. 7A-7C illustrate different occlusion effects. The first two figures, FIGS. 7A and 7B, illustrate incorrect occlusion effects that are attributable to the quality of the depth information associated with the 3D model of the reconstructed physical object (in this case, person 701). Inaccurate depth within the 3D model may cause under-occlusion. FIG. 7A illustrates an example of under-occlusion between a passthrough visualization of a person 701 and a virtual object 702. The person 701 is in front of the object 702, relative to the viewer. While the person 701 is occluding a significant portion of the virtual object 702, some portions 710 of the virtual object 702 that should be occluded remain visible. As a result, those portions 710 of the virtual object 702 cover a portion of the person 701, even though the virtual object 702 is behind the person 701.

FIG. 7B illustrates an example of over-occlusion between the person 701 and the virtual object 702. This example is similar to what was shown in scene 600 of FIG. 6—a portion of empty space 720 incorrectly occludes a portion of the virtual object 702. The issues may be attributable to the smoothing process that causes the 3D mesh to transition smoothly at the contours of a reconstructed object, even if there should be a hard edge separating it from the background. For example, the portion 720 of what appears to be empty space could be represented by a portion of a 3D mesh that extends from the person 701 to the background, causing that portion 720 of empty space to have depth values that are similar to that of the person 701. Since a rendering system may determine visibility based strictly on the relative depth of the 3D models, it would conclude that the portion of empty space 720 appears in front of the virtual object 702 and, consequently, should occlude the virtual object 702.

FIG. 7C illustrates an example of correct occlusion between the person and the virtual object 702. Since the person 701 is close to the viewer than the virtual object 702, it correctly occludes the virtual object 702 as needed.

Figure 8:
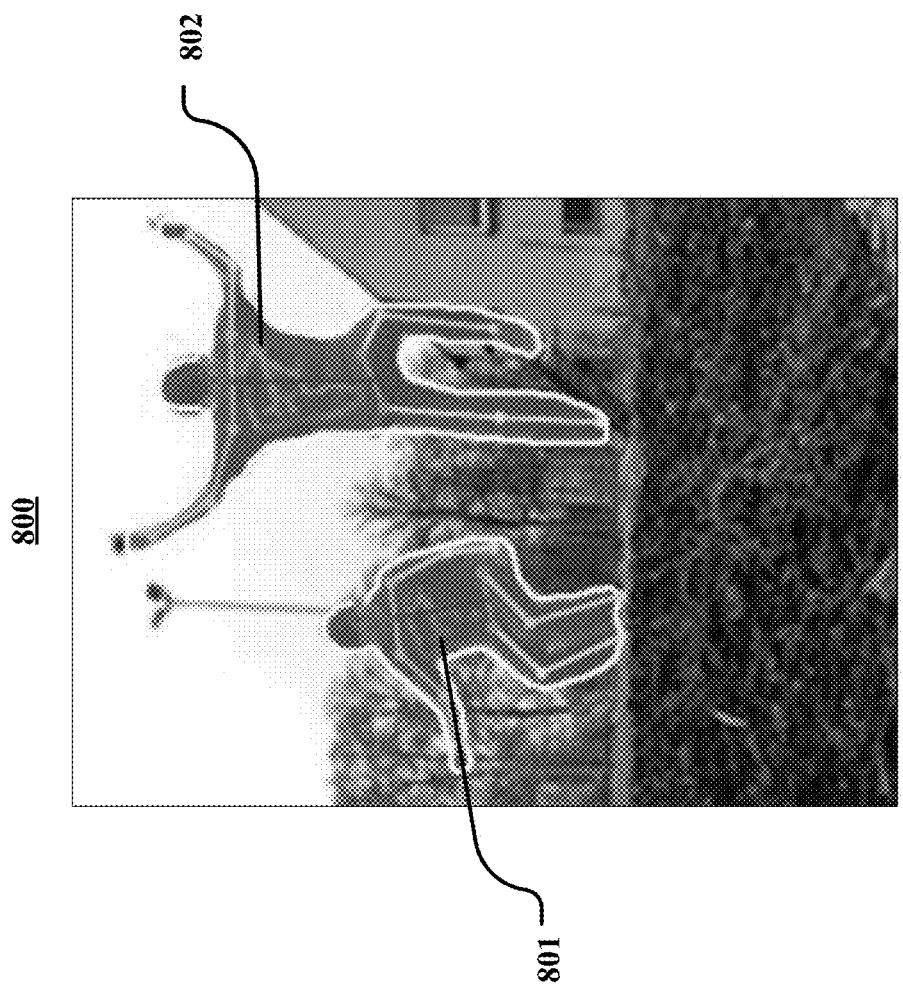
FIG. 8 illustrates an example of an image overlaid with instance segmentation masks, in accordance with particular embodiments.

In particular embodiments, the aforementioned under-occlusion and over-occlusion problems may be solved by using instance segmentation masks to help a rendering system make occlusion decisions. Instance segmentation is a computer-vision technique for identifying instances of particular objects depicted in an image. For example, FIG. 8 illustrates an example of an image 800 overlaid with instance segmentation masks 801 and 802, which identify pixels in the image 800 that correspond to the two detected persons. In particular embodiments, an image captured by a camera may be processed using a machine-learning model to identify particular objects of interest (e.g., humans, dogs, cats, tables, chairs, cups, etc.). The machine-learning model may output an instance segmentation mask, which may take the form of a matrix. Each value in the matrix may correspond to a pixel in the image and indicate whether that pixel belongs to a particular detected instance of an object of interest. For example, mask 801 indicates that the corresponding pixels in the image 800 belong to a first person, and the mask 802 indicates that the corresponding pixels in the image 800 belong to a second person. The embodiments described herein may use any suitable instance segmentation technique to identify instances of objects of interest in images. For example, particular embodiments may use Mask R-CNN to generate instance segmentation masks. Details of various embodiments of Mask R-CNN are described in U.S. patent application Ser. No. 15/922,734 (filed on 15 Mar. 2018) and Ser. No. 15/971,997 (filed on 4 May 2018), which are hereby incorporated by reference in their entirety.

In particular embodiments, instance segmentation masks may be used to help a modified rendering system determine the proper occlusion between objects. The under-occlusion problem may be solved as follows, according to particular embodiments. As previously described, when rendering a passthrough visualization of a physical object, a rendering system is provided with a 3D model of the environment and a corresponding texture image, which could be one of the images captured by a camera of the HMD. The texture image may be processed using any suitable instance segmentation technique (e.g., Mask R-CNN) to generate an instance segmentation mask.

Figure 9A:
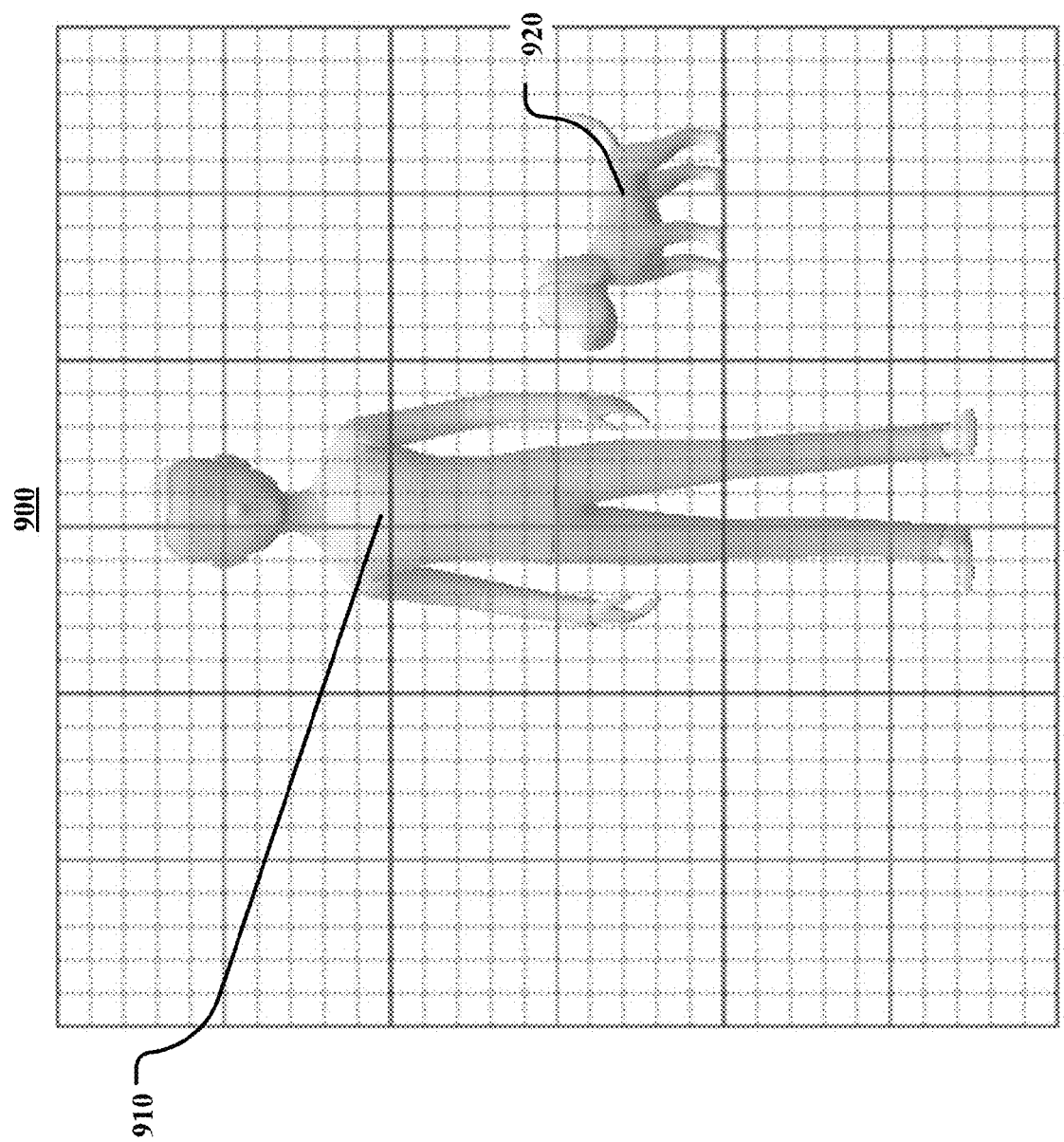
FIG. 9A illustrates an example of an instance segmentation mask, in accordance with particular embodiments.

FIG. 9A illustrates an example of an instance segmentation mask 900 that identifies an instance of a person 910 and an instance of a dog 920. In this simple example, two object instances are identified, but this disclosure contemplates a mask that could identify any number of instances of any object types. If the instance segmentation technique (e.g., Mask R-CNN) is configured to generate multiple masks per input image, with each mask identifying a single object instance found in the image, then those masks could be aggregated to generate a single mask. Each pixel within the mask could have an index value that identifies the particular object instance with which the pixel is associated. For example, in FIG. 9A, the pixels (represented by the grids) that overlap with the person 910 may all have the same index value that associates those pixels with the detected instance of the person 910. Similarly, the pixels that overlap with the dog 920 may all have another index value that associates those pixels with the detected instance of the dog 920.

In particular embodiments, an estimated depth value may be computed for each of the instance segmentations in the mask. Since pixels in the mask correspond to pixels in the texture image (e.g., the image captured by the HMD and used to generate the 3D model of the physical environment) and each pixel in the texture corresponds to a portion of the 3D model (e.g., a vertex of a triangle or polygon that forms the 3D model), a depth value could be computed for each pixel within an instance segmentation based on the 3D model. The depth values associated with the pixels of an instance segmentation may then be used to compute a representative depth value for the entire instance segmentation. For example, the depth values associated with the pixels in an instance segmentation may be averaged to derive the representative depth value. As an example, the person 910 in FIG. 9A may be assigned a representative depth value of i, even though the true depth of different parts of the person 910 may vary (e.g., the person's 910 neck may be farther away than his nose). Similarly, the dog 920 may be assigned a representative value of j.

In particular embodiments, the representative depth value for an instance segmentation may be computed as follows. A computing system may retrieve 3D coordinates on the 3D model that correspond to pixels in an instance segmentation. Based on the 3D coordinates, the system may compute a 3D centroid for the corresponding object (e.g., the centroid of the person). The centroid's depth from the viewer may be used as the representative depth value for the instance segmentation. A similar process may be performed for each instance segmentation identified in the mask.

As will be described in further detail below, the instance segmentation mask and the representative depth values for the identified instance segmentation may be used by the rendering system to avoid the under-occlusion problem. By having a representative depth value for each instance, the rendering system could render more consistently (even if less accurately) and, as a result, generate more visually-appealing occlusion effects.

Figure 9B:
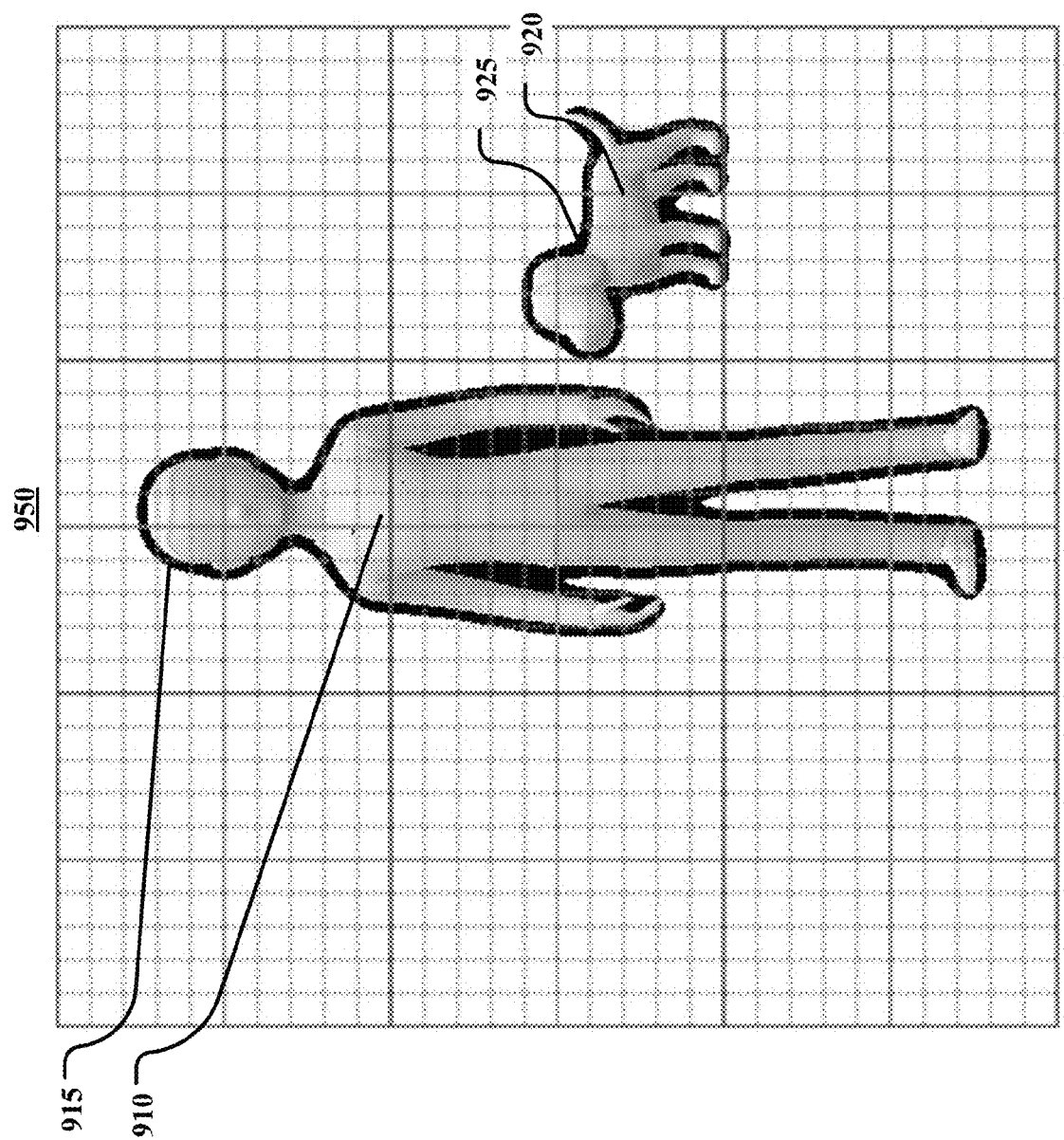
FIG. 9B illustrates an example of an instance segmentation mask with padded borders, in accordance with particular embodiments.

With respect to the over-occlusion, the instance segmentation mask could again be used to help the rendering system make the appropriate occlusion determination. FIG. 9B illustrates an example of an instance segmentation mask 950 that identifies an instance of a person 910 and an instance of a dog, along with padded borders 915 and 925 around their contours. The padded borders 915 and 925 may be generated using any suitable means. For example, a gradient of the instance segmentation of the person 910 may be computed to generate its border 915. In particular embodiments, the computing system may compute a morphological gradient (e.g., dilation and erosion) with ellipse element to generate the padded border 915. The padded border 915 may then be assigned a depth value that is farther than the representative depth value of the corresponding instance segmentation of the person 910. For example, if the person 910 has a representative depth value of i, the representative depth value of the padded border 915 may be $i+k_i$, where $k_i$ is a constant depth value. In a similar manner, the padded border 925 of the dog 920 may be assigned a representative depth value of $j+k_j$. The added depth may be the same (i.e., $k_i=k_j$) or different (i.e., $k_i \neq k_j$). As a result, the pixels corresponding to the padded borders 915, 925 have depth values that are farther than that of the instance segmentation of the person 910 and dog 920. By adding padded borders to the instance segmentation with significantly higher depth values, the border between the instance segmentation and the background may become more pronounced to enforce a hard edge and address the over-occlusion problem.

In particular embodiments, the rendering system may make occlusion decisions based on the instance segmentation mask and the representative depth value assigned to each instance segmentation and its padded border. For example, the rendering system may perform visibility tests for each pixel of the image to the rendered. In particular embodiments, the rendering system may do so by casting rays from the viewer (e.g., the position of each eye of the user) towards each pixel in screen space and see which parts of the available 3D models (for both the physical environment and the virtual objects) are intersected by the rays. As previously described, under-occlusion and over-occlusion may result if the rendering system compares the measured depths of the 3D model of the physical environment to the known depths of the virtual objects to determine occlusion.

Instead of using the measured depths of the 3D model, the rendering system may use information associated with the instance segmentation mask to make occlusion decisions. For example, after the system determines a point of intersection between a cast ray and the 3D model of the physical environment, the system could look up the corresponding pixel in the instance segmentation mask for the physical environment (similar to a texture look-up). The pixel in the mask, as previously described, is assigned an instance ID (e.g., a value indicating that the pixel belongs to the person 910 or dog 920 in FIG. 9A), which in turn is associated with a representative depth value for the corresponding instance segmentation. The representative depth value could be either the object instance itself (e.g., person 910) or its padded border (e.g., 915). The rendering system may use that representative depth value instead of the measured depth value of the point of intersection on the 3D model to make occlusion decisions. For example, if the representative depth value is closer to the viewer than the known depth of a virtual object, then the rendering system would render the passthrough visualization over that virtual object. Conversely, if the representative depth value is farther, then the virtual object would be rendered over the passthrough visualization. In cases where the point of intersection of a ray does not correspond to an instance segmentation in the mask, then the depth value used for occlusion determination would be that of the point on the 3D model.

Figure 10:
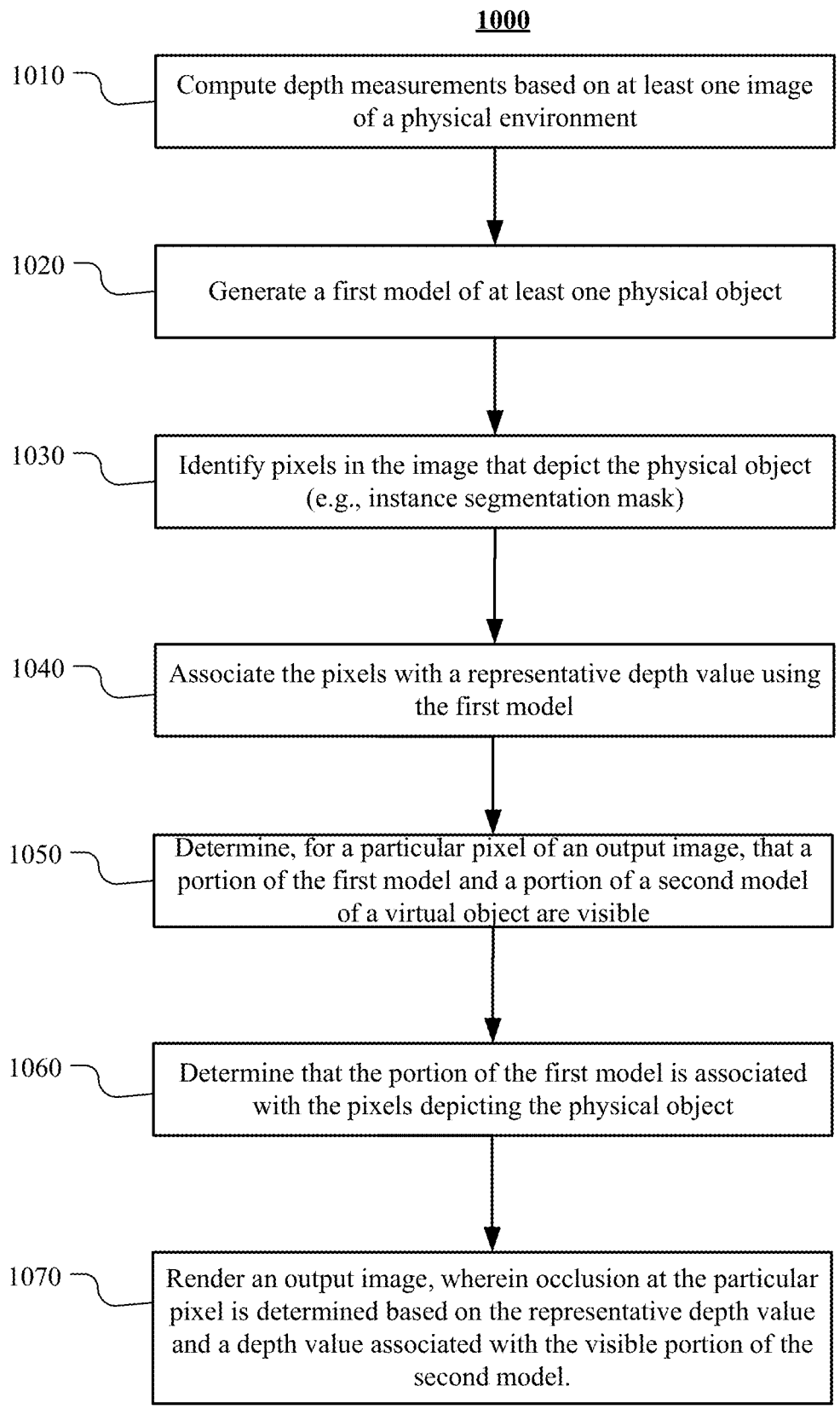
FIG. 10 illustrates an example method 1000 for rendering 3D passthrough, in accordance with particular embodiments.

FIG. 10 illustrates an example method 1000 for rendering 3D passthrough. The method may begin at step 1010, where a computing system associated with an artificial reality device may compute, based on at least one image of a physical environment surrounding a user, depth measurements of at least one physical object. For example, the system may use triangulation techniques to compute depth measurements from stereo images. At step 1020, the system may generate a first model of the at least one physical object using the depth measurements. For example, the first model may be a 3D mesh representation of the physical environment.

At step 1030, the system may identify a plurality of first pixels in the image that depict the physical object. For example, the system may process one of the stereo images using a machine-learning model (e.g., Mask R-CNN) to generate one or more instance segmentation masks. The mask identifies the pixels in the original image that correspond to particular objects of interest (e.g., a person). At step 1040, the system may associate the plurality of first pixels with a first representative depth value computed using the first model. For example, the first representative depth value may be an average of the depth values associated with portions of the 3D model corresponding to the plurality of first pixels (e.g., the pixels in the instance segmentation mask). In particular embodiments, the h system may determine a plurality of portions of the first model that are associated with the plurality of first pixels. The system may determine a plurality of depth values associated with the plurality of portions of the first model. The system may then compute the first representative depth value based on the plurality of depth values (e.g., by taking an average). In another embodiment, the system may determine a plurality of portions of the first model that are associated with the plurality of first pixels. The system may determine a plurality of coordinates associated with the plurality of portions of the first model. The system may then determine a centroid based on the plurality of coordinates and compute the first representative depth value based on the centroid.

Next, the system may render an output image based on the 3D models and the instance segmentation mask. At step 1050, the system may determine, for a pixel of an output image, that a portion of the first model and a portion of a second model of a virtual object are visible from a viewpoint. For example, the system may cast rays through each pixel in screen space to test for visibility. For a particular pixel, the system may determine that the ray intersects a model of a physical object and a model of a virtual object. At step 1060, the system may determine that the portion of the first model is associated with the plurality of first pixels. For example, the system may determine that the visible portion of the first model (e.g., the model of the physical object) corresponds to an object instance identified by the instance segmentation mask. As such, for that pixel, the system may determine the proper occlusion based on a comparison between the first representative depth value and a depth value associated with the portion of the second model of the virtual object. At step 1070, the system may render and output the output image depicting the physical object and the virtual object from the perspective of the user.

To further address over-occlusion, the system may perform the following additional steps. The system may identify a plurality of second pixels in the image that correspond to a padded boundary around the plurality of first pixels. For example, the system may compute a gradient of the plurality of first pixels identified in the instance segmentation mask to identify the padded boundary around the instance segmentation. The system may associate the plurality of second pixels with a second representative depth value computed based on the first representative depth value. For example, the system may add a constant depth to the depth value assigned to the instance segmentation. Then, when rendering the output image, the system may determine, for a second pixel of the output image, that a second portion of the first model and a second portion of the second model of the virtual object are visible from the viewpoint. The system may determine that the second portion of the first model is associated with the plurality of second pixels. For example, the system may determine that the visible portion of the first model corresponds to the padded boundary in the mask. As such, the system may determine the occlusion at the second pixel based on a comparison between the second representative depth value and a second depth value associated with the second portion of the second model.

If the objects that are visible to a particular pixel are not associated with any of the instance segmentations identified in the mask, then occlusion may be determined based on the depth values of their models. Continuing with the example described with reference to FIG. 10, the system may determine, for a second pixel of the output image, that a second portion of the first model and a second portion of the second model of the virtual object are visible from the viewpoint. The system may determine that the second portion of the first model is associated with a corresponding pixel in the image that is outside of the plurality of first pixels. As such, the system may determine the occlusion at the second pixel based on a comparison between a second depth value associated with the second portion of the second model and a third depth value associated with the second portion of the first model.

Particular embodiments may repeat one or more steps of the method of FIG. 10, where appropriate. Although this disclosure describes and illustrates particular steps of the method of FIG. 10 as occurring in a particular order, this disclosure contemplates any suitable steps of the method of FIG. 10 occurring in any suitable order. Moreover, although this disclosure describes and illustrates an example method for generating 3D passthrough, including the particular steps of the method of FIG. 10, this disclosure contemplates any suitable method for generating 3D passthrough, including any suitable steps, which may include a subset of the steps of the method of FIG. 10, where appropriate. Furthermore, although this disclosure describes and illustrates particular components, devices, or systems carrying out particular steps of the method of FIG. 10, this disclosure contemplates any suitable combination of any suitable components, devices, or systems carrying out any suitable steps of the method of FIG. 10.

Figure 11:
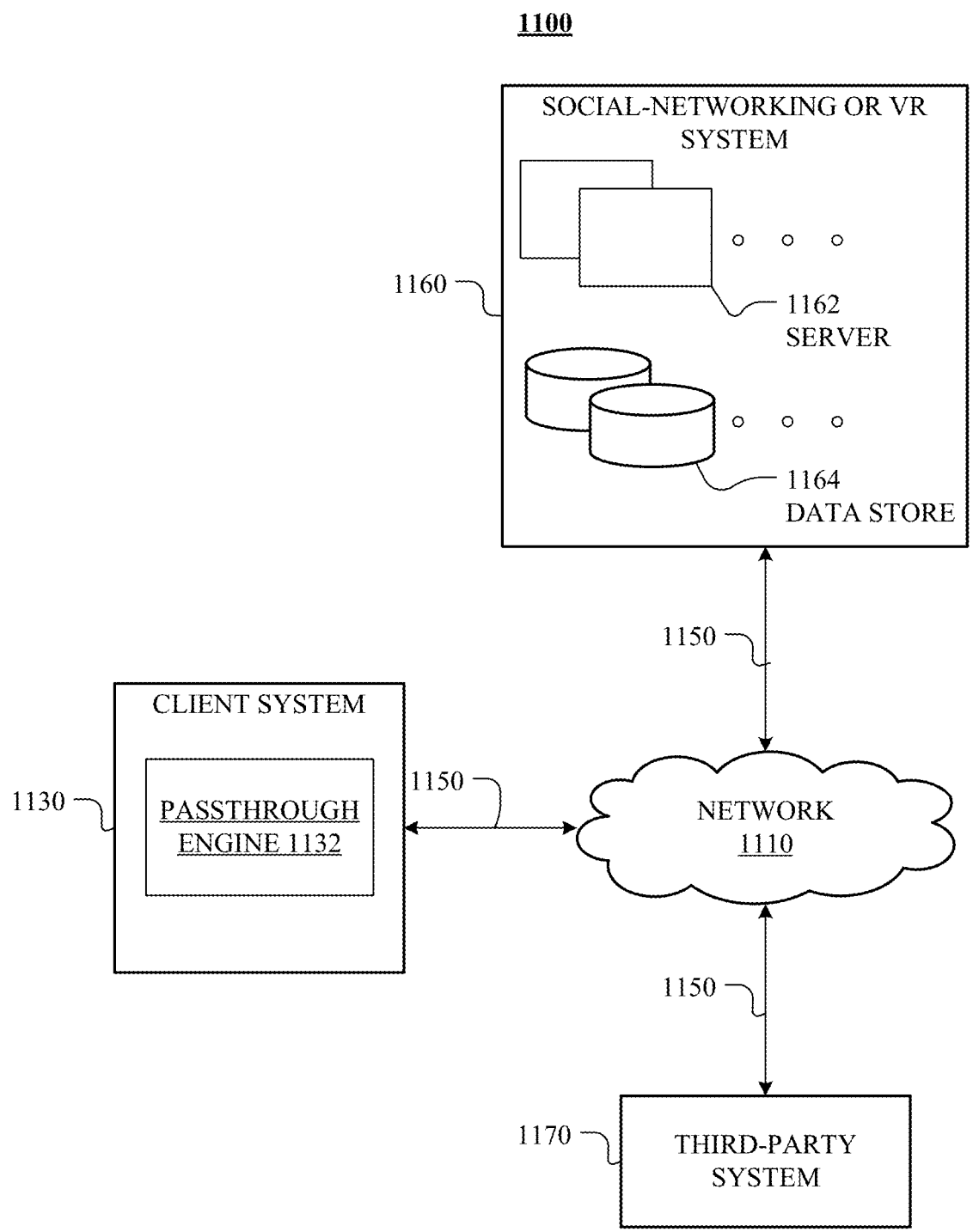
FIG. 11 illustrates an example network environment associated with a VR or social-networking system.

FIG. 11 illustrates an example network environment 1100 associated with a VR or social-networking system. Network environment 1100 includes a client system 1130, a VR or social-networking system 1160, and a third-party system 1170 connected to each other by a network 1110. Although FIG. 11 illustrates a particular arrangement of client system 1130, VR or social-networking system 1160, third-party system 1170, and network 1110, this disclosure contemplates any suitable arrangement of client system 1130, VR or social-networking system 1160, third-party system 1170, and network 1110. As an example and not by way of limitation, two or more of client system 1130, VR or social-networking system 1160, and third-party system 1170 may be connected to each other directly, bypassing network 1110. As another example, two or more of client system 1130, VR or social-networking system 1160, and third-party system 1170 may be physically or logically co-located with each other in whole or in part. Moreover, although FIG. 11 illustrates a particular number of client systems 1130, VR or social-networking systems 1160, third-party systems 1170, and networks 1110, this disclosure contemplates any suitable number of client systems 1130, VR or social-networking systems 1160, third-party systems 1170, and networks 1110. As an example and not by way of limitation, network environment 1100 may include multiple client system 1130, VR or social-networking systems 1160, third-party systems 1170, and networks 1110.

This disclosure contemplates any suitable network 1110. As an example and not by way of limitation, one or more portions of network 1110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 1110 may include one or more networks 1110.

Links 1150 may connect client system 1130, social-networking system 1160, and third-party system 1170 to communication network 1110 or to each other. This disclosure contemplates any suitable links 1150. In particular embodiments, one or more links 1150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 1150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 1150, or a combination of two or more such links 1150. Links 1150 need not necessarily be the same throughout network environment 1100. One or more first links 1150 may differ in one or more respects from one or more second links 1150.

In particular embodiments, client system 1130 may be an electronic device including hardware, software, or embedded logic components or a combination of two or more such components and capable of carrying out the appropriate functionalities implemented or supported by client system 1130. As an example and not by way of limitation, a client system 1130 may include a computer system such as a desktop computer, notebook or laptop computer, netbook, a tablet computer, e-book reader, GPS device, camera, personal digital assistant (PDA), handheld electronic device, cellular telephone, smartphone, augmented/virtual reality device, other suitable electronic device, or any suitable combination thereof. This disclosure contemplates any suitable client systems 1130. A client system 1130 may enable a network user at client system 1130 to access network 1110. A client system 1130 may enable its user to communicate with other users at other client systems 1130.

In particular embodiments, client system 1130 (e.g., an HMD) may include a passthrough engine 1132 to provide the passthrough feature described herein, and may have one or more add-ons, plug-ins, or other extensions. A user at client system 1130 may connect to a particular server (such as server 1162, or a server associated with a third-party system 1170). The server may accept the request and communicate with the client system 1130.

In particular embodiments, VR or social-networking system 1160 may be a network-addressable computing system that can host an online Virtual Reality environment or social network. VR or social-networking system 1160 may generate, store, receive, and send social-networking data, such as, for example, user-profile data, concept-profile data, social-graph information, or other suitable data related to the online social network. Social-networking or VR system 1160 may be accessed by the other components of network environment 1100 either directly or via network 1110. As an example and not by way of limitation, client system 1130 may access social-networking or VR system 1160 using a web browser, or a native application associated with social-networking or VR system 1160 (e.g., a mobile social-networking application, a messaging application, another suitable application, or any combination thereof) either directly or via network 1110. In particular embodiments, social-networking or VR system 1160 may include one or more servers 1162. Each server 1162 may be a unitary server or a distributed server spanning multiple computers or multiple datacenters. Servers 1162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 1162 may include hardware, software, or embedded logic components or a combination of two or more such components for carrying out the appropriate functionalities implemented or supported by server 1162. In particular embodiments, social-networking or VR system 1160 may include one or more data stores 1164. Data stores 1164 may be used to store various types of information. In particular embodiments, the information stored in data stores 1164 may be organized according to specific data structures. In particular embodiments, each data store 1164 may be a relational, columnar, correlation, or other suitable database. Although this disclosure describes or illustrates particular types of databases, this disclosure contemplates any suitable types of databases. Particular embodiments may provide interfaces that enable a client system 1130, a social-networking or VR system 1160, or a third-party system 1170 to manage, retrieve, modify, add, or delete, the information stored in data store 1164.

In particular embodiments, social-networking or VR system 1160 may store one or more social graphs in one or more data stores 1164. In particular embodiments, a social graph may include multiple nodes—which may include multiple user nodes (each corresponding to a particular user) or multiple concept nodes (each corresponding to a particular concept)—and multiple edges connecting the nodes. Social-networking or VR system 1160 may provide users of the online social network the ability to communicate and interact with other users. In particular embodiments, users may join the online social network via social-networking or VR system 1160 and then add connections (e.g., relationships) to a number of other users of social-networking or VR system 1160 to whom they want to be connected. Herein, the term "friend" may refer to any other user of social-networking or VR system 1160 with whom a user has formed a connection, association, or relationship via social-networking or VR system 1160.

In particular embodiments, social-networking or VR system 1160 may provide users with the ability to take actions on various types of items or objects, supported by social-networking or VR system 1160. As an example and not by way of limitation, the items and objects may include groups or social networks to which users of social-networking or VR system 1160 may belong, events or calendar entries in which a user might be interested, computer-based applications that a user may use, transactions that allow users to buy or sell items via the service, interactions with advertisements that a user may perform, or other suitable items or objects.

A user may interact with anything that is capable of being represented in social-networking or VR system 1160 or by an external system of third-party system 1170, which is separate from social-networking or VR system 1160 and coupled to social-networking or VR system 1160 via a network 1110.

In particular embodiments, social-networking or VR system 1160 may be capable of linking a variety of entities. As an example and not by way of limitation, social-networking or VR system 1160 may enable users to interact with each other as well as receive content from third-party systems 1170 or other entities, or to allow users to interact with these entities through an application programming interfaces (API) or other communication channels.

In particular embodiments, a third-party system 1170 may include one or more types of servers, one or more data stores, one or more interfaces, including but not limited to APIs, one or more web services, one or more content sources, one or more networks, or any other suitable components, e.g., that servers may communicate with. A third-party system 1170 may be operated by a different entity from an entity operating social-networking or VR system 1160. In particular embodiments, however, social-networking or VR system 1160 and third-party systems 1170 may operate in conjunction with each other to provide social-networking services to users of social-networking or VR system 1160 or third-party systems 1170. In this sense, social-networking or VR system 1160 may provide a platform, or backbone, which other systems, such as third-party systems 1170, may use to provide social-networking services and functionality to users across the Internet.

In particular embodiments, a third-party system 1170 may include a third-party content object provider. A third-party content object provider may include one or more sources of content objects, which may be communicated to a client system 1130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking or VR system 1160 also includes user-generated content objects, which may enhance a user's interactions with social-networking or VR system 1160. User-generated content may include anything a user can add, upload, send, or "post" to social-networking or VR system 1160. As an example and not by way of limitation, a user communicates posts to social-networking or VR system 1160 from a client system 1130. Posts may include data such as status updates or other textual data, location information, photos, videos, links, music or other similar data or media. Content may also be added to social-networking or VR system 1160 by a third-party through a "communication channel," such as a newsfeed or stream.

In particular embodiments, social-networking or VR system 1160 may include a variety of servers, sub-systems, programs, modules, logs, and data stores. In particular embodiments, social-networking or VR system 1160 may include one or more of the following: a web server, action logger, API-request server, relevance-and-ranking engine, content-object classifier, notification controller, action log, third-party-content-object-exposure log, inference module, authorization/privacy server, search module, advertisementtargeting module, user-interface module, user-profile store, connection store, third-party content store, or location store. Social-networking or VR system 1160 may also include suitable components such as network interfaces, security mechanisms, load balancers, failover servers, management-and-network-operations consoles, other suitable components, or any suitable combination thereof. In particular embodiments, social-networking or VR system 1160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking or VR system 1160 to one or more client systems 1130 or one or more third-party system 1170 via network 1110. The web server may include a mail server or other messaging functionality for receiving and routing messages between social-networking or VR system 1160 and one or more client systems 1130. An API-request server may allow a third-party system 1170 to access information from social-networking or VR system 1160 by calling one or more APIs. An action logger may be used to receive communications from a web server about a user's actions on or off social-networking or VR system 1160. In conjunction with the action log, a third-party-content-object log may be maintained of user exposures to third-party-content objects. A notification controller may provide information regarding content objects to a client system 1130. Information may be pushed to a client system 1130 as notifications, or information may be pulled from client system 1130 responsive to a request received from client system 1130. Authorization servers may be used to enforce one or more privacy settings of the users of social-networking or VR system 1160. A privacy setting of a user determines how particular information associated with a user can be shared. The authorization server may allow users to opt in to or opt out of having their actions logged by social-networking or VR system 1160 or shared with other systems (e.g., third-party system 1170), such as, for example, by setting appropriate privacy settings. Third-party-content-object stores may be used to store content objects received from third parties, such as a third-party system 1170. Location stores may be used for storing location information received from client systems 1130 associated with users. Advertisement-pricing modules may combine social information, the current time, location information, or other suitable information to provide relevant advertisements, in the form of notifications, to a user.

Figure 12:
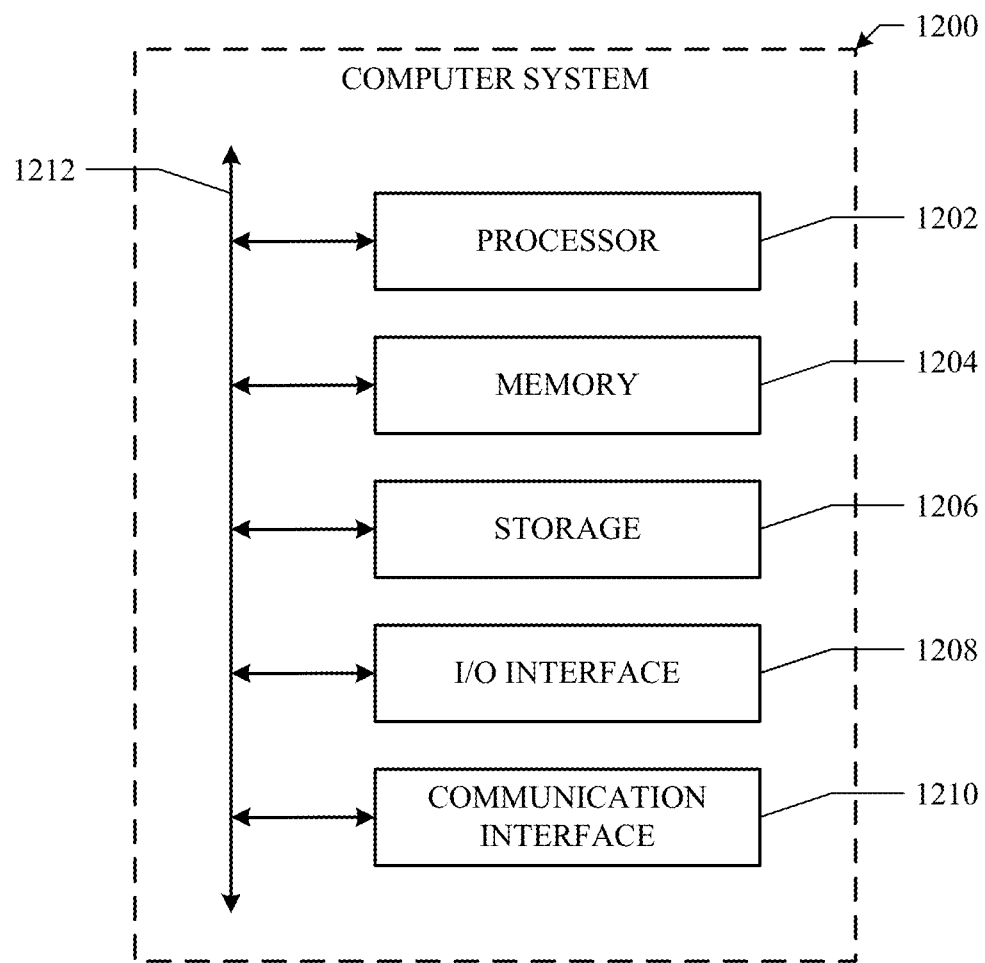
FIG. 12 illustrates an example computer system.

FIG. 12 illustrates an example computer system 1200. In particular embodiments, one or more computer systems 1200 perform one or more steps of one or more methods described or illustrated herein. In particular embodiments, one or more computer systems 1200 provide functionality described or illustrated herein. In particular embodiments, software running on one or more computer systems 1200 performs one or more steps of one or more methods described or illustrated herein or provides functionality described or illustrated herein. Particular embodiments include one or more portions of one or more computer systems 1200. Herein, reference to a computer system may encompass a computing device, and vice versa, where appropriate. Moreover, reference to a computer system may encompass one or more computer systems, where appropriate.

This disclosure contemplates any suitable number of computer systems 1200. This disclosure contemplates computer system 1200 taking any suitable physical form. As example and not by way of limitation, computer system 1200 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 1200 may include one or more computer systems 1200; be unitary or distributed; span multiple locations; span multiple machines; span multiple data centers; or reside in a cloud, which may include one or more cloud components in one or more networks. Where appropriate, one or more computer systems 1200 may perform without substantial spatial or temporal limitation one or more steps of one or more methods described or illustrated herein. As an example and not by way of limitation, one or more computer systems 1200 may perform in real time or in batch mode one or more steps of one or more methods described or illustrated herein. One or more computer systems 1200 may perform at different times or at different locations one or more steps of one or more methods described or illustrated herein, where appropriate.

In particular embodiments, computer system 1200 includes a processor 1202, memory 1204, storage 1206, an input/output (I/O) interface 1208, a communication interface 1210, and a bus 1212. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1202 includes hardware for executing instructions, such as those making up a computer program. As an example and not by way of limitation, to execute instructions, processor 1202 may retrieve (or fetch) the instructions from an internal register, an internal cache, memory 1204, or storage 1206; decode and execute them; and then write one or more results to an internal register, an internal cache, memory 1204, or storage 1206. In particular embodiments, processor 1202 may include one or more internal caches for data, instructions, or addresses. This disclosure contemplates processor 1202 including any suitable number of any suitable internal caches, where appropriate. As an example and not by way of limitation, processor 1202 may include one or more instruction caches, one or more data caches, and one or more translation lookaside buffers (TLBs). Instructions in the instruction caches may be copies of instructions in memory 1204 or storage 1206, and the instruction caches may speed up retrieval of those instructions by processor 1202. Data in the data caches may be copies of data in memory 1204 or storage 1206 for instructions executing at processor 1202 to operate on; the results of previous instructions executed at processor 1202 for access by subsequent instructions executing at processor 1202 or for writing to memory 1204 or storage 1206; or other suitable data. The data caches may speed up read or write operations by processor 1202. The TLBs may speed up virtual-address translation for processor 1202. In particular embodiments, processor 1202 may include one or more internal registers for data, instructions, or addresses. This disclosure contemplates processor 1202 including any suitable number of any suitable internal registers, where appropriate. Where appropriate, processor 1202 may include one or more arithmetic logic units (ALUs); be a multi-core processor; or include one or more processors 1202. Although this disclosure describes and illustrates a particular processor, this disclosure contemplates any suitable processor.

In particular embodiments, memory 1204 includes main memory for storing instructions for processor 1202 to execute or data for processor 1202 to operate on. As an example and not by way of limitation, computer system 1200 may load instructions from storage 1206 or another source (such as, for example, another computer system 1200) to memory 1204. Processor 1202 may then load the instructions from memory 1204 to an internal register or internal cache. To execute the instructions, processor 1202 may retrieve the instructions from the internal register or internal cache and decode them. During or after execution of the instructions, processor 1202 may write one or more results (which may be intermediate or final results) to the internal register or internal cache. Processor 1202 may then write one or more of those results to memory 1204. In particular embodiments, processor 1202 executes only instructions in one or more internal registers or internal caches or in memory 1204 (as opposed to storage 1206 or elsewhere) and operates only on data in one or more internal registers or internal caches or in memory 1204 (as opposed to storage 1206 or elsewhere). One or more memory buses (which may each include an address bus and a data bus) may couple processor 1202 to memory 1204. Bus 1212 may include one or more memory buses, as described below. In particular embodiments, one or more memory management units (MMUs) reside between processor 1202 and memory 1204 and facilitate accesses to memory 1204 requested by processor 1202. In particular embodiments, memory 1204 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1204 may include one or more memories 1204, where appropriate. Although this disclosure describes and illustrates particular memory, this disclosure contemplates any suitable memory.

In particular embodiments, storage 1206 includes mass storage for data or instructions. As an example and not by way of limitation, storage 1206 may include a hard disk drive (HDD), a floppy disk drive, flash memory, an optical disc, a magneto-optical disc, magnetic tape, or a Universal Serial Bus (USB) drive or a combination of two or more of these. Storage 1206 may include removable or non-removable (or fixed) media, where appropriate. Storage 1206 may be internal or external to computer system 1200, where appropriate. In particular embodiments, storage 1206 is non-volatile, solid-state memory. In particular embodiments, storage 1206 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1206 taking any suitable physical form. Storage 1206 may include one or more storage control units facilitating communication between processor 1202 and storage 1206, where appropriate. Where appropriate, storage 1206 may include one or more storages 1206. Although this disclosure describes and illustrates particular storage, this disclosure contemplates any suitable storage.

In particular embodiments, I/O interface 1208 includes hardware, software, or both, providing one or more interfaces for communication between computer system 1200 and one or more I/O devices. Computer system 1200 may include one or more of these I/O devices, where appropriate. One or more of these I/O devices may enable communication between a person and computer system 1200. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1208 for them. Where appropriate, I/O interface 1208 may include one or more device or software drivers enabling processor 1202 to drive one or more of these I/O devices. I/O interface 1208 may include one or more I/O interfaces 1208, where appropriate. Although this disclosure describes and illustrates a particular I/O interface, this disclosure contemplates any suitable I/O interface.

In particular embodiments, communication interface 1210 includes hardware, software, or both providing one or more interfaces for communication (such as, for example, packet-based communication) between computer system 1200 and one or more other computer systems 1200 or one or more networks. As an example and not by way of limitation, communication interface 1210 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1210 for it. As an example and not by way of limitation, computer system 1200 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1200 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1200 may include any suitable communication interface 1210 for any of these networks, where appropriate. Communication interface 1210 may include one or more communication interfaces 1210, where appropriate. Although this disclosure describes and illustrates a particular communication interface, this disclosure contemplates any suitable communication interface.

In particular embodiments, bus 1212 includes hardware, software, or both coupling components of computer system 1200 to each other. As an example and not by way of limitation, bus 1212 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1212 may include one or more buses 1212, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by a computing system:
   computing, based on at least one image of a physical environment surrounding a user, depth measurements of at least one physical object;
   generating a first model of the at least one physical object using the depth measurements;
   identifying a plurality of first pixels in the image that depict the physical object;
   associating the plurality of first pixels with a first representative depth value computed using the first model;
   determining, for a pixel of an output image, that a portion of the first model and a portion of a second model of a virtual object are visible from a viewpoint;
   determining that the portion of the first model is associated with the plurality of first pixels; and
   rendering the output image depicting the physical object and the virtual object from the perspective of the user, wherein occlusion at the pixel is determined based on a comparison between the first representative depth value and a depth value associated with the portion of the second model.

2. The method of claim 1, wherein the plurality of first pixels in the image are identified by an instance segmentation mask.

3. The method of claim 2, wherein the instance segmentation mask is generated by processing the image using a machine-learning model.

4. The method of claim 1, wherein the first representative depth value is computed by:
   determining a plurality of portions of the first model that are associated with the plurality of first pixels;
   determining a plurality of depth values associated with the plurality of portions of the first model; and
   computing the first representative depth value based on the plurality of depth values.

5. The method of claim 1, wherein the first representative depth value is computed by:
   determining a plurality of portions of the first model that are associated with the plurality of first pixels;
   determining a plurality of coordinates associated with the plurality of portions of the first model;
   determining a centroid based on the plurality of coordinates; and
   computing the first representative depth value based on the centroid.

6. The method of claim 1, further comprising:
   identifying a plurality of second pixels in the image that correspond to a padded boundary around the plurality of first pixels;
   associating the plurality of second pixels with a second representative depth value computed based on the first representative depth value, the second representative depth value being larger than the first representative depth value;
   determining, for a second pixel of the output image, that a second portion of the first model and a second portion of the second model of the virtual object are visible from the viewpoint; and
   determining that the second portion of the first model is associated with the plurality of second pixels;
   wherein occlusion at the second pixel is determined based on a comparison between the second representative depth value and a second depth value associated with the second portion of the second model.

7. The method of claim 6, wherein the plurality of second pixels are identified based on a gradient of the plurality of first pixels.

8. The method of claim 1, further comprising:
determining, for a second pixel of the output image, that a second portion of the first model and a second portion of the second model of the virtual object are visible from the viewpoint; and
determining that the second portion of the first model is associated with a corresponding pixel in the image that is outside of the plurality of first pixels;
wherein occlusion at the second pixel is determined based on a comparison between a second depth value associated with the second portion of the second model and a third depth value associated with the second portion of the first model.

9. One or more computer-readable non-transitory storage media embodying software that is operable when executed to:
compute, based on at least one image of a physical environment surrounding a user, depth measurements of at least one physical object;
generate a first model of the at least one physical object using the depth measurements;
identify a plurality of first pixels in the image that depict the physical object;
associate the plurality of first pixels with a first representative depth value computed using the first model;
determine, for a pixel of an output image, that a portion of the first model and a portion of a second model of a virtual object are visible from a viewpoint;
determine that the portion of the first model is associated with the plurality of first pixels; and
render the output image depicting the physical object and the virtual object from the perspective of the user, wherein occlusion at the pixel is determined based on a comparison between the first representative depth value and a depth value associated with the portion of the second model.

10. The media of claim 9, wherein the software is further operable when executed to:
determine a plurality of portions of the first model that are associated with the plurality of first pixels;
determine a plurality of depth values associated with the plurality of portions of the first model; and
compute the first representative depth value based on the plurality of depth values.

11. The media of claim 9, wherein the software is further operable when executed to:
determine a plurality of portions of the first model that are associated with the plurality of first pixels;
determine a plurality of coordinates associated with the plurality of portions of the first model;
determine a centroid based on the plurality of coordinates; and
compute the first representative depth value based on the centroid.

12. The media of claim 9, wherein the software is further operable when executed to:
identify a plurality of second pixels in the image that correspond to a padded boundary around the plurality of first pixels;
associate the plurality of second pixels with a second representative depth value computed based on the first representative depth value, the second representative depth value being larger than the first representative depth value;
determine, for a second pixel of the output image, that a second portion of the first model and a second portion of the second model of the virtual object are visible from the viewpoint; and
determine that the second portion of the first model is associated with the plurality of second pixels;
wherein occlusion at the second pixel is determined based on a comparison between the second representative depth value and a second depth value associated with the second portion of the second model.

13. The media of claim 12, wherein the plurality of second pixels are identified based on a gradient of the plurality of first pixels.

14. The media of claim 9, wherein the software is further operable when executed to:
determine, for a second pixel of the output image, that a second portion of the first model and a second portion of the second model of the virtual object are visible from the viewpoint; and
determine that the second portion of the first model is associated with a corresponding pixel in the image that is outside of the plurality of first pixels;
wherein occlusion at the second pixel is determined based on a comparison between a second depth value associated with the second portion of the second model and a third depth value associated with the second portion of the first model.

15. A system comprising:
one or more processors; and
one or more computer-readable non-transitory storage media coupled to one or more of the processors and comprising instructions operable when executed by one or more of the processors to cause the system to:
compute, based on at least one image of a physical environment surrounding a user, depth measurements of at least one physical object;
generate a first model of the at least one physical object using the depth measurements;
identify a plurality of first pixels in the image that depict the physical object;
associate the plurality of first pixels with a first representative depth value computed using the first model;
determine, for a pixel of an output image, that a portion of the first model and a portion of a second model of a virtual object are visible from a viewpoint;
determine that the portion of the first model is associated with the plurality of first pixels; and
render the output image depicting the physical object and the virtual object from the perspective of the user, wherein occlusion at the pixel is determined based on a comparison between the first representative depth value and a depth value associated with the portion of the second model.

16. The system of claim 15, wherein the one or more of the processors are further operable when executing the instructions to cause the system to:
determine a plurality of portions of the first model that are associated with the plurality of first pixels;
determine a plurality of depth values associated with the plurality of portions of the first model; and
compute the first representative depth value based on the plurality of depth values.

17. The system of claim 15, wherein the one or more of the processors are further operable when executing the instructions to cause the system to:
- determine a plurality of portions of the first model that are associated with the plurality of first pixels;
- determine a plurality of coordinates associated with the plurality of portions of the first model;
- determine a centroid based on the plurality of coordinates; and
- compute the first representative depth value based on the centroid.

18. The system of claim 15, wherein the one or more of the processors are further operable when executing the instructions to cause the system to:
- identify a plurality of second pixels in the image that correspond to a padded boundary around the plurality of first pixels;
- associate the plurality of second pixels with a second representative depth value computed based on the first representative depth value, the second representative depth value being larger than the first representative depth value;
- determine, for a second pixel of the output image, that a second portion of the first model and a second portion of the second model of the virtual object are visible from the viewpoint; and
- determine that the second portion of the first model is associated with the plurality of second pixels;
- wherein occlusion at the second pixel is determined based on a comparison between the second representative depth value and a second depth value associated with the second portion of the second model.

19. The system of claim 18, wherein the plurality of second pixels are identified based on a gradient of the plurality of first pixels.

20. The system of claim 15, wherein the one or more of the processors are further operable when executing the instructions to cause the system to:
- determine, for a second pixel of the output image, that a second portion of the first model and a second portion of the second model of the virtual object are visible from the viewpoint; and
- determine that the second portion of the first model is associated with a corresponding pixel in the image that is outside of the plurality of first pixels;
- wherein occlusion at the second pixel is determined based on a comparison between a second depth value associated with the second portion of the second model and a third depth value associated with the second portion of the first model.

* * * * *